United States Patent
Kotrla et al.

(10) Patent No.: US 10,669,804 B2
(45) Date of Patent: Jun. 2, 2020

(54) SYSTEM HAVING FITTING WITH FLOATING SEAL INSERT

(71) Applicant: Cameron International Corporation, Houston, TX (US)

(72) Inventors: Johnnie Kotrla, Katy, TX (US); Tait Russell Swanson, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 545 days.

(21) Appl. No.: 15/393,027

(22) Filed: Dec. 28, 2016

(65) Prior Publication Data
US 2017/0184228 A1   Jun. 29, 2017

Related U.S. Application Data

(60) Provisional application No. 62/272,576, filed on Dec. 29, 2015.

(51) Int. Cl.
*E21B 33/06* (2006.01)
*F16L 1/26* (2006.01)

(52) U.S. Cl.
CPC .................. *E21B 33/06* (2013.01); *F16L 1/26* (2013.01)

(58) Field of Classification Search
CPC ........................................................ E21B 33/06
See application file for complete search history.

(56) References Cited

U.S. PATENT DOCUMENTS

| | | | | |
|---|---|---|---|---|
| 2,937,598 A * | 5/1960 | Brown | .................... | E21B 37/04 277/328 |
| 3,055,682 A * | 9/1962 | Bacher | .................... | F16L 33/00 285/222.1 |
| 3,224,817 A * | 12/1965 | Miller | ................. | F15B 15/1433 277/439 |
| 3,254,908 A * | 6/1966 | Schlosser | ................ | F16L 33/01 285/222.1 |
| 4,281,726 A * | 8/1981 | Garrett | .................... | E21B 4/003 175/321 |
| 4,715,526 A * | 12/1987 | MacNeil | ................ | B23K 3/087 228/180.21 |
| 5,617,879 A * | 4/1997 | Kubala | .................... | F16J 15/164 277/398 |
| 6,263,982 B1* | 7/2001 | Hannegan | ............. | E21B 21/001 175/195 |
| 6,505,649 B1* | 1/2003 | Dixon-Roche | ....... | F16L 11/045 138/125 |
| 6,923,476 B2* | 8/2005 | Smith, III | ............... | F16L 17/02 251/149.7 |
| 8,215,645 B1* | 7/2012 | Aho, Jr. | .................. | F16J 15/342 277/370 |
| 9,157,293 B2* | 10/2015 | Kotrla | .................... | E21B 33/064 |
| 2002/0070014 A1* | 6/2002 | Kinder | .................. | E21B 33/085 166/84.3 |
| 2006/0159376 A1* | 7/2006 | Takayama | ............... | B22F 7/008 384/276 |

(Continued)

*Primary Examiner* — Matthew R Buck
*Assistant Examiner* — Aaron L Lembo

(57) ABSTRACT

A system includes a hose fitting. The hose fitting includes a body, a fluid passage through the body, a first end portion, a second end portion, and a first floating seal insert. The first end portion and the second end portion are in fluid communication with the fluid passage. The first floating seal insert is disposed in the first end portion and is configured to damp one or more shockwaves having first characteristics.

26 Claims, 15 Drawing Sheets

(56) References Cited

U.S. PATENT DOCUMENTS

| | | | |
|---|---|---|---|
| 2009/0057026 A1* | 3/2009 | Williams | E21B 33/085 175/195 |
| 2009/0315276 A1* | 12/2009 | Smith, III | F16L 1/26 277/641 |
| 2011/0308815 A1* | 12/2011 | Kotrla | E21B 33/038 166/380 |
| 2019/0056024 A1* | 2/2019 | Anglin | F16H 57/043 |

* cited by examiner

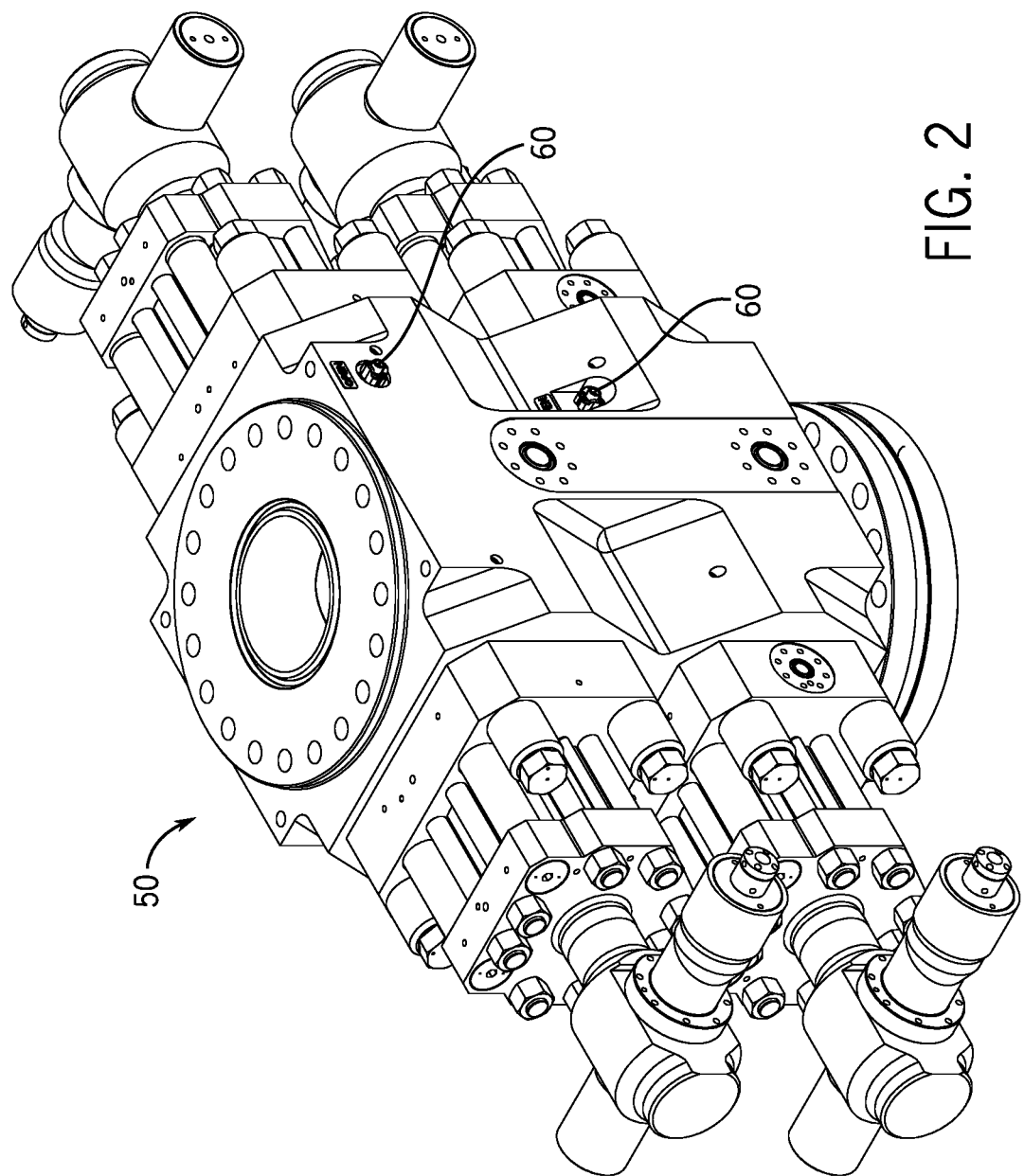

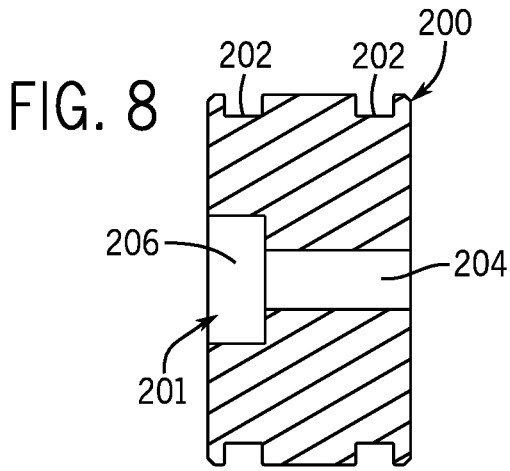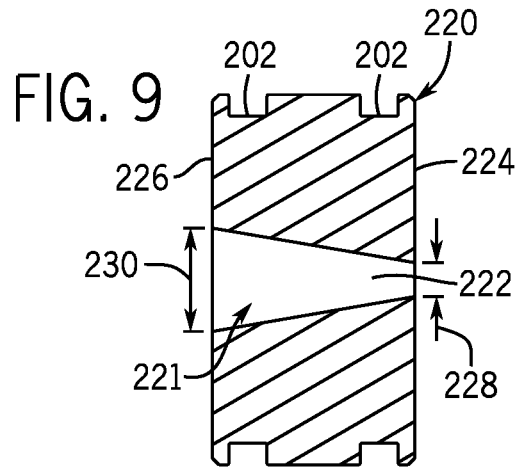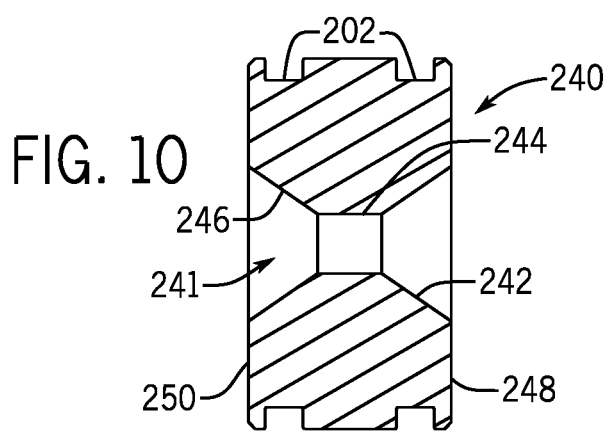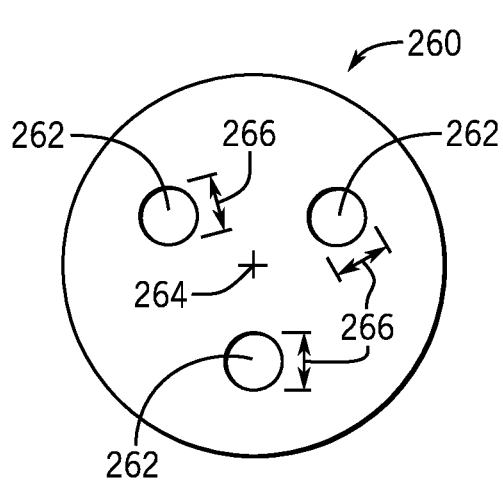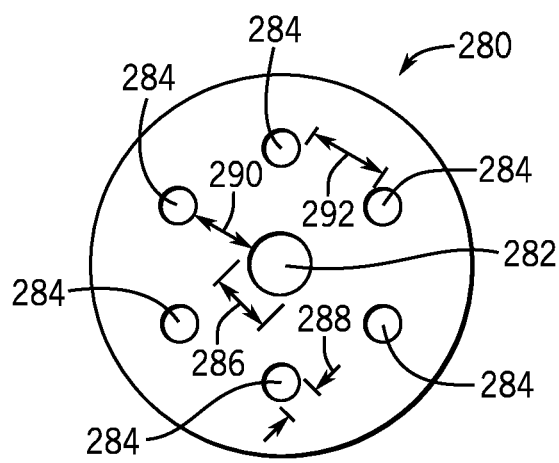

US 10,669,804 B2

SYSTEM HAVING FITTING WITH FLOATING SEAL INSERT

CROSS REFERENCE TO RELATED APPLICATION

This application claims priority to and benefit of U.S. Provisional Application No. 62/272,576, entitled "System Having Fitting with Floating Seal Insert", filed Dec. 29, 2015, which is herein incorporated by reference in its entirety.

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel to power modern civilization in a wide variety of mobile vehicles as well as stationary plants and factories of all kinds. Further, oil and natural gas are frequently used to heat homes during winter, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations. For example, the wellhead assemblies may include a variety of hydraulically actuated equipment, such as a blowout preventer (BOP).

As subsea installations migrate to greater depths, such as 10,000 ft or deeper, greater hydraulic pressures are required to overcome the hydrostatic pressure. As a result, the greater hydraulic pressures can increase the possibility of undesirable shockwaves traveling through the hydraulic lines and equipment upon opening and closing hydraulic valves. Shockwaves traveling through hydraulic lines may cause flexible hydraulic lines (e.g., hoses) to jump, which may in turn cause threaded hose interfaces to loosen and leak.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 2 is a partial perspective view of a blowout preventer (BOP) having tunable conduit fitting assemblies in accordance with an embodiment of the present disclosure;

FIG. 8 is a cross-sectional side view of an embodiment of the shock-dampening floating seal insert of FIGS. 2-7, illustrating a stepped internal passage tuned to certain fluid dynamics in the mineral extraction system;

FIG. 9 is a cross-sectional side view of an embodiment of the shock-dampening floating seal insert of FIGS. 2-7, illustrating a diverging internal passage tuned to certain fluid dynamics in the mineral extraction system;

FIG. 10 is a cross-sectional side view of an embodiment of the shock-dampening floating seal insert of FIGS. 2-7, illustrating a converging-diverging internal passage tuned to certain fluid dynamics in the mineral extraction system;

FIG. 11 is a front view of an embodiment of the shock-dampening floating seal insert of FIGS. 2-7, illustrating a set of three internal passages tuned to certain fluid dynamics in the mineral extraction system;

FIG. 12 is a front view of an embodiment of the shock-dampening floating seal insert of FIGS. 2-7, illustrating a set of seven internal passages tuned to certain fluid dynamics in the mineral extraction system;

DETAILED DESCRIPTION OF SPECIFIC EMBODIMENTS

Figure 1:
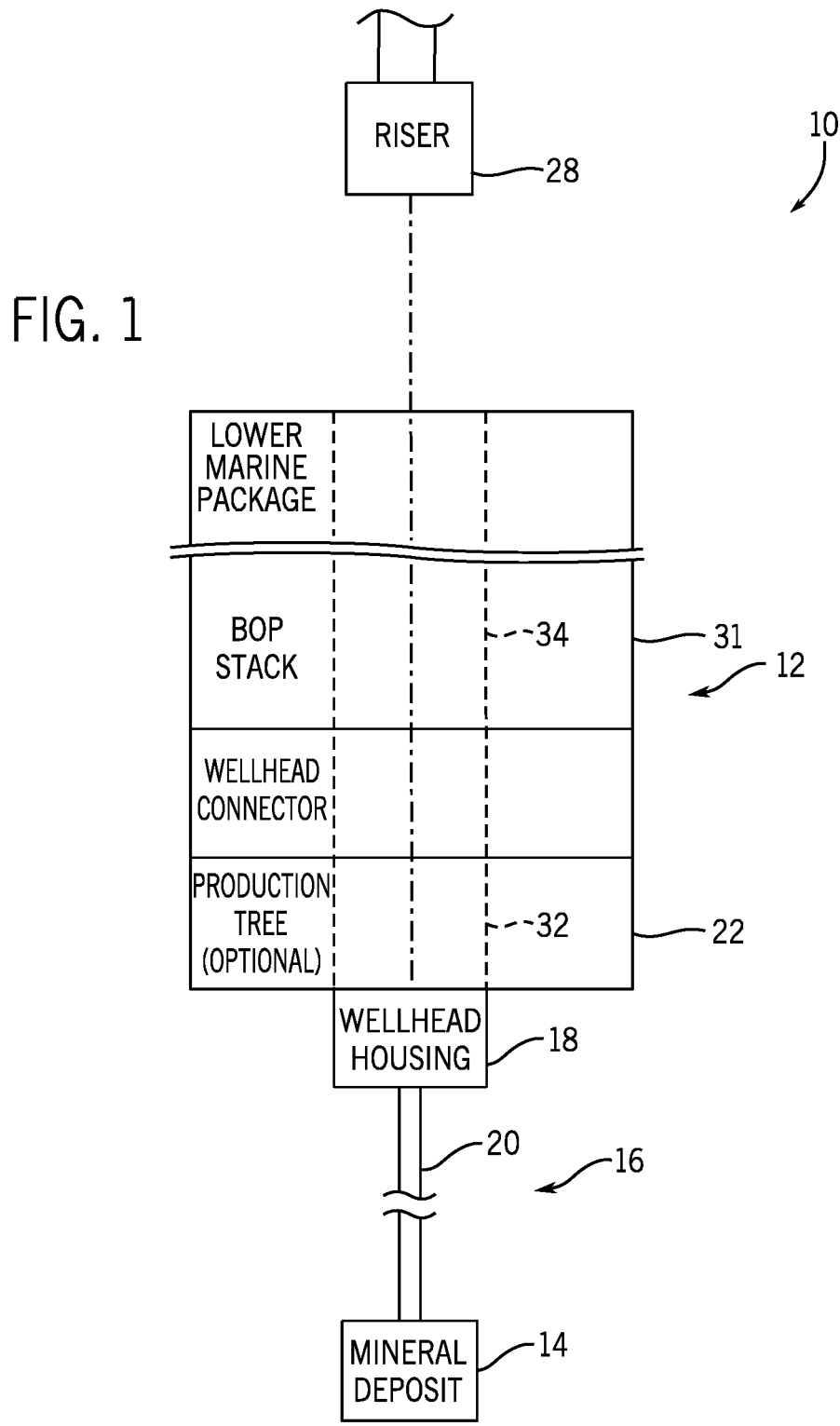
FIG. 1 is a block diagram of a mineral extraction system in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

As discussed in detail below, the disclosed embodiments include a tunable conduit fitting assembly having a fluid-dynamic tuning floating seal insert (e.g., a shock-dampening floating seal insert), which may be selectively replaced with one of a plurality of alternative fluid-dynamic tuning floating seal insert (e.g., shock-dampening floating seal inserts). Each floating seal insert may be tuned to certain fluid dynamics (e.g., expected shockwaves) in a mineral extraction system. For example, each floating seal insert may have one or more internal passages of different diameters, shapes, patterns, or any combination thereof. In certain embodiments, a first floating seal insert may have a single internal passage of a first diameter, a second floating seal insert may have a single internal passage of a second diameter larger than the first diameter, a third floating seal insert may have a single internal passage of a third diameter larger than the first and second diameters, and so forth. However, the disclosed embodiments may include any number (e.g., 1 to 1000) of different floating seal inserts with a single internal passage of a different diameter. Likewise, the disclosed embodiments may include any number (e.g., 1 to 1000) of different floating seal inserts with different numbers and/or patterns of passages with equal or different diameters. For example, a first floating seal insert may have a plurality of passages (e.g., 1 to 50) with a first diameter, shape, or pattern, whereas a second floating seal insert may have a plurality of passages (e.g., 1 to 50) of a second diameter, shape, or pattern different than the first diameter, shape, or pattern. As discussed below, the fluid-dynamic tuning floating seal insert (e.g., shock-dampening floating seal insert) may be selected and/or designed to tune the tunable conduit fitting assembly to fluid dynamics unique to a particular fluid system (e.g., a mineral extraction system), thereby substantially reducing shockwaves and/or increasing performance of the fluid system. An advantage of this tuning is the ability to reduce the size of the equipment, because the equipment is no longer subject to the detrimental effects of shockwaves traveling through the fluid passages. Although the disclosed embodiments are presented in context of dampening shockwaves, the floating seal insert may include a variety of features (e.g., passages, textures, and shapes) to tune a fluid dynamic characteristic (e.g., dampen shockwaves, control flow rates, create or limit turbulence, etc.) along a fluid path.

Additionally, the disclosed embodiments include a hose fitting for interfacing with a hose at a first end portion and a double o-ring seal sub assembly at a second end portion. The hose fitting may include a bend (e.g., 45 degrees, 90 degrees, or any other bend). The hose fitting may interface with the hose at the first end portion via a threads, crimping, an expansion fitting, clamping, welding, bonding, brazing, adhesive coupling, an interference fit, a shrink-fit, etc. The double o-ring seal sub assembly at the second end portion may have a fluid-dynamic tuning floating seal insert (e.g., a shock-dampening floating seal insert), which may be selectively replaced with one of a plurality of alternative fluid-dynamic tuning floating seal inserts (e.g., shock-dampening floating seal inserts). Each floating seal insert may be tuned to certain fluid dynamics (e.g., expected shockwaves) in a mineral extraction system. An advantage of this system is the ability to reduce or eliminate "jumping" hydraulic hoses as a result of shock. The system may also reduce or eliminate leakage that results from threaded metal-to-metal seals loosening and backing off.

FIG. 1 is a block diagram of an embodiment of a mineral extraction system 10 having one or more tunable conduit and/or hose fitting assemblies, which connect with fluid lines (e.g., hydraulic conduits, flexible hoses, etc.). As discussed below, each tunable conduit and/or hose fitting assembly includes a fluid-dynamic tuning floating seal insert (e.g., a shock-dampening floating seal insert). The floating seal insert is capable of axial movement along a range of movement when mounted between first and second components, and includes at least one first seal to seal with the first component and at least one second seal to seal with second component. In this manner, the floating seal insert improves sealing between the first and second components, even if movement occurs between the first and second components (e.g., shock, vibration, loosening of connection, etc.). The floating seal insert also includes one or more features to tune the fluid dynamic characteristic (e.g., dampen shockwaves, control flow rates, create or limit turbulence, etc.) in the system 10. As discussed in detail below, the tunable conduit fitting assemblies may include hose fittings, which connect with a hose via a crimp coupling.

The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead assembly 12 coupled to a mineral deposit 14 via a well 16, wherein the well 16 includes a wellhead hub 18 and a well-bore 20. The wellhead hub 18 generally includes a large diameter hub that is disposed at the termination of the well-bore 20. The wellhead hub 18 provides for the sealable connection of the wellhead assembly 12 to the well 16.

The wellhead assembly 12 typically includes multiple components that control and regulate activities and conditions associated with the well 16. For example, the wellhead assembly 12 generally includes bodies, valves and seals that route produced minerals from the mineral deposit 14, provide for regulating pressure in the well 16, and provide for the injection of chemicals into the well-bore 20 (down-hole). In the illustrated embodiment, the wellhead assembly 12 includes what is colloquially referred to as a Christmas tree 22 (hereinafter, a tree), a tubing spool 24, and other components. The system 10 may include other devices that are coupled to the wellhead assembly 12, and devices that are used to assemble and control various components of the wellhead assembly 12. For example, in the illustrated embodiment, the system 10 includes a riser 28 coupled to a floating rig (not shown). In addition, the system may include various spool bodies, e.g., tubing spool or casing spools, that are used to support strings via hangers, such as tubing hangers that support production tubing and casing hangers that support production casing.

The tree 22 generally includes a variety of flow paths (e.g., bores), valves, fittings, and controls for operating the well 16. For instance, the tree 22 may include a frame that is disposed about a tree body, a flow-loop, actuators, and valves. Further, the tree 22 may provide fluid communication with the well 16. For example, the tree 22 includes a tree bore 32. Moreover, the tree 22 may be a horizontal tree that includes a tree bore 32 that provides for completion and workover procedures, such as the insertion of tools into the well 16, the injection of various chemicals into the well 16 (down-hole), and the like. Further, minerals extracted from the well 16 (e.g., oil and natural gas) may be regulated and routed via the tree 22. For instance, the tree 22 may be coupled to a jumper or a flowline that is tied back to other components, such as a manifold. Accordingly, produced minerals flow from the well 16 to the manifold via the wellhead assembly 12 and/or the tree 22 before being routed to shipping or storage facilities. A blowout preventer (BOP) 31 may also be included during drilling or workover operations, in cooperation with the tree 22 or as a separate device without a tree. The BOP 31 may consist of a variety of valves, fittings, and controls to prevent oil, gas, or other fluid from exiting the well in the event of an unintentional release of pressure or an unanticipated overpressure condition. These valves, fittings, and controls may also be referred to as a "BOP stack."

The tree 22 or BOP 31 may be mounted to a spool body, or wellhead housing 18. Typically, the tree 22 and BOP 31 are aligned such that the central bores of each of these devices align with the well-bore 20. Thus, the bore in the tree 22 and the BOP 31 provide access to the well bore 20 for various completion and workover procedures. For example, components can be run down to the wellhead assembly 12 to seal-off the well bore 20, to inject chemicals down-hole, to suspend tools down-hole, to retrieve tools down-hole, and the like. The riser 28 may be connected to the wellhead assembly 12 via a lower-marine riser package (LMRP) that facilitates limited movement of the riser 28.

The mineral extraction system 10 includes a variety of fluid lines, e.g., hydraulic control lines, chemical lines, or other liquid lines, which may be subject to potential shockwaves during operation. The lines may include flexible or resilient hoses, which may be susceptible to move due to shock, vibration, and/or fluid flow through the hoses. For example, the BOP 31 may be hydraulically operated and may close the wellhead assembly 12 or seal off various components of the wellhead assembly 12. Thus, the BOP 31 may be coupled to a source of hydraulic pressure, e.g., a pressurized hydraulic fluid line, to enable hydraulic control of the BOP 31. As discussed below, the disclosed embodiments include one or more tunable conduit fitting assemblies (e.g., hose fittings) coupled to the BOP 31 and other equipment, wherein each tunable conduit fitting assembly includes a shock-dampening floating seal insert.

FIG. 2 is a perspective view of an embodiment of a blowout preventer (BOP) 50 having a plurality of tunable conduit fitting assemblies 60 (e.g., hose fittings), which are configured to couple with fluid lines (e.g., hydraulic conduits or hoses). However, each tunable conduit fitting assembly 60 may couple to a variety of components within the mineral extraction system 10, e.g., pumps, valves (e.g., gate valves, ball valves, etc.), accumulators, diverters, chokes, hydraulic drives and systems, chemical injection systems (e.g., a chemical injection metering valve), and other flow control equipment. As discussed in detail below, the tunable conduit fitting assemblies 60 may include a variety of fitting shapes (e.g., straight fitting, bend fitting, split fitting, etc.), connection types (e.g., threads, interference fit, crimp coupling, welded connection, flange coupling, etc.), materials (e.g., metal, plastic, ceramic, etc.), or any combination thereof. For example, the tunable conduit fitting assembly 60 may include a straight fitting or bend fitting (e.g., acutely angled fitting or 90 degree fitting), which has a first end portion with a first coupling (e.g., threads, interference fit, crimp coupling, welded connection, flange coupling, etc.), a second end portion with a second coupling (e.g., same or different from first coupling), and at least one floating seal insert disposed in the first and/or second coupling.

The tunable conduit fitting assembly 60 is specifically tuned to the fluid dynamics of the BOP 50 and/or the mineral extraction system 10. For example, the tunable conduit fitting assembly 60 may be specifically designed to dampen shockwaves expected to occur in the BOP 50 and/or other flow control equipment in the mineral extraction system 10, thereby helping to reduce or eliminate movement (e.g., vibration, jumping, etc.) that may otherwise occur in the fluid lines (e.g., hydraulic conduits, flexible hoses, etc.), fittings, and connected equipment. An advantage of this tuning is the ability to reduce the size of the equipment, because the equipment is no longer subject to the detrimental effects of shockwaves traveling through the fluid passages. For example, the tuning may allow usage of down-sized or downgraded conduits and fittings with the BOP 50 and/or other flow control equipment. Furthermore, by dampening shockwaves, the system may reduce or eliminate jumping in hydraulic lines and leaking at the fitting connections (e.g., hose interfaces, component interfaces, etc.), such as threaded couplings, crimp couplings, flanged and/or bolted couplings, welded connections, interference fits, or any combination thereof.

Figure 3:
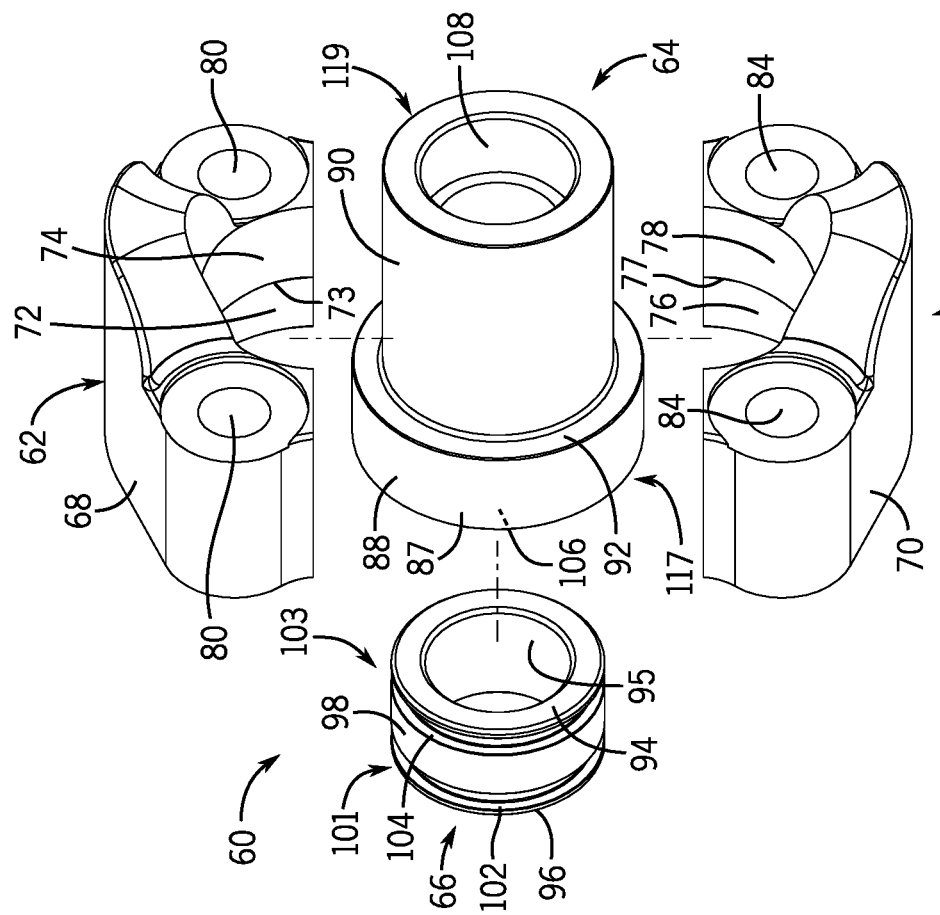
FIG. 3 is an exploded perspective view of an embodiment of the tunable conduit fitting assembly of FIG. 2, illustrating a shock-dampening floating seal insert tuned to fluid dynamics (e.g., expected shockwaves) of the mineral extraction system.

FIG. 3 is an exploded perspective view of an embodiment of the tunable conduit fitting assembly 60 of FIG. 2. In the illustrated embodiment, the conduit fitting assembly 60 includes a split flange assembly 62, a conduit fitting 64, and a fluid-dynamic tuning floating seal insert (e.g., a shock-dampening floating seal insert) 66. In certain embodiments, the flange assembly 62 may be manufactured as a one-piece flange (e.g., a hinged flange) or a multi-piece flange with greater than two pieces. The floating seal insert 66 may be made of Polyether ether ketone (PEEK), elastomer, stainless steel, fire resistant elastomer, graphite-filled polytetrafluoroethylene (PTFE), aluminum bronze, naval brass, and the like. As discussed in detail below, the floating seal insert 66 may be configured to float (e.g., move in an axial direction) while disposed in the assembly 60, thereby enabling the floating seal insert 66 to maintain a seal despite movement between components coupled to the conduit fitting assembly 60. Furthermore, the floating seal insert 66 may be specifically designed (e.g., tuned) to dampen shockwaves of a certain frequency, wavelength, and/or magnitude. In the illustrated embodiment, the floating seal insert 66 is tuned to dampen shockwaves unique to fluid dynamics of the mineral extraction system 10 and/or the BOP 31 or 50. In certain embodiments, the floating seal insert 66 is tuned to control other fluid dynamic characteristics, such as the flow rate, turbulence, and so forth.

As illustrated, the split flange assembly 62 comprises a first flange section 68 and a second flange section 70. The first flange section 68 may define a first flange 73 (e.g., a first axial abutment surface) between a first cylindrical mating surface 72 and a second cylindrical mating surface 74. More specifically, the first cylindrical mating surface 72 has a larger diameter than the second cylindrical mating surface 74, thereby defining a disc-shaped step as the first flange 73 between the surfaces 72 and 74. The second flange section 70 may define a second flange 77 (e.g., a second axial abutment surface) between a third cylindrical mating surface 76 and a fourth cylindrical mating surface 78. The split flange geometry may be defined per standard specification (e.g., ASME, ANSI, SAE, ISO, etc.) Again, the third cylindrical mating surface 76 has a larger diameter than the fourth cylindrical mating surface 78, thereby defining a disc-shaped step as the second flange 77 between the surfaces 76 and 78. In addition, the first flange section 68 may define a plurality of bolt receptacles 80, and the second flange section 70 may also define a plurality of bolt receptacles 84. The bolt receptacles 80 and 84 receive bolts to fasten the split flange assembly 62 to a component, such as the BOP 31 or 50. In the illustrated embodiment, the split flange assembly 62 includes four bolt receptacles 84. In certain embodiments, the flange assembly 62 may include any number of bolt receptacles 84 in a split flange construction (e.g., illustrated sections 68 and 70), a one-piece construction, or a multi-piece construction (e.g., two or more sections).

The conduit fitting 64 may be coupled to the end of a hydraulic hose, or other flexible or rigid fluid conduit. The conduit fitting 64 includes a first cylindrical exterior surface 88 and a second cylindrical exterior surface 90. As illustrated, the diameter of the first cylindrical exterior surface 88 is larger than the diameter of the second cylindrical exterior surface 90, thereby defining an intermediate flange 92 (e.g., axial abutment surface). For example, the intermediate flange 92 may be described as a disc-shaped step between the surfaces 88 and 90. As discussed below, the intermediate flange 92 mates with the flanges 73 and 77 of the first and second flange sections 68 and 70, thereby enabling the split flange assembly 62 to bias the conduit fitting 64 against a component (e.g., BOP 31 or 50). In addition, the conduit fitting 64 includes a first counterbore 106 within the first cylindrical exterior surface 88, and a second counterbore 108 within the second cylindrical exterior surface 90.

The floating seal insert 66 is configured to mount within the first counterbore 106 of the conduit fitting 64, while maintaining the ability to float (e.g., move) in an axial direction after the conduit fitting assembly 60 is mounted between components (e.g., conduit and BOP). The illustrated floating seal insert 66 includes a first disc-shaped contact surface 94 and a second disc-shaped contact surface 96, e.g., opposite axial ends of the insert 66. In addition, the floating seal insert 66 includes an annular exterior surface 98 and a shock-dampening fluid passage 95. As discussed below, the shock-dampening fluid passage 95 may be a single passage configured to enable fluid flow, while also dampening any shockwave traveling in the fluid flow. In particular, the shock-dampening fluid passage 95 may be specifically tuned to certain shockwaves, e.g., frequency, wavelength, and/or magnitude. In the illustrated embodiment, the shock-dampening fluid passage 95 may be specifically tuned to shockwaves expected in the BOP 31 or 50. The annular exterior surface 98 may include a first annular groove 102 and a second annular groove 104. The grooves 102 and 104 are configured to support seals (e.g., O-rings) between the surface 98 of the floating seal insert 66 and the surfaces 72 and 76 of the first and second flange sections 68 and 70. The axial spacing of these grooves 102 and 104, and thus the seals, enables the floating seal insert 66 to maintain a sealed connection over a range of movement within the conduit fitting assembly 60.

Figure 4:
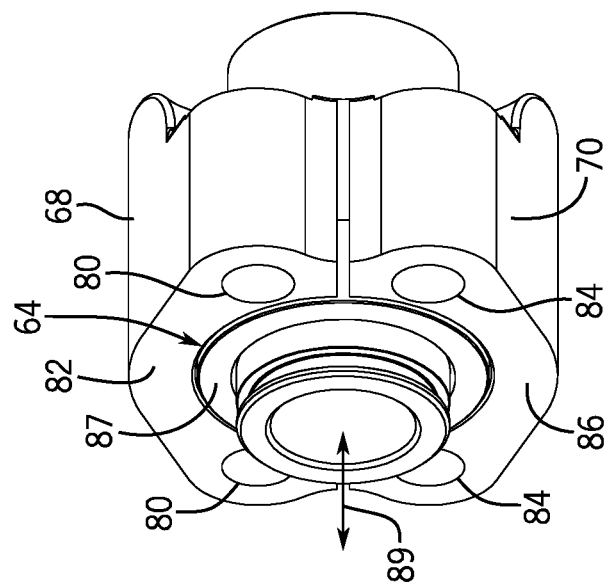
FIG. 4 is an assembled perspective view of an embodiment of the tunable conduit fitting assembly of FIG. 3.

FIG. 4 is an assembled perspective view of an embodiment of the tunable conduit fitting assembly 60 of FIG. 3, illustrating the floating seal insert 66 disposed inside the conduit fitting 64. Referring generally to FIGS. 3 and 4, the first mating surface 72 and the second mating surface 74 of the first flange section 68 are mated respectively to the first exterior surface 88 and the second exterior surface 90 of the conduit fitting 64. The first flange 73 of the first flange section 68 abuts against the flange 92 of the conduit fitting 64. Similarly, the third mating surface 76 and the fourth mating surface 78 of the second flange section 70 mate respectively with the first exterior surface 88 and the second exterior surface 90 of the conduit fitting 64. The second flange 77 of the second flange section 70 abuts against the flange 92 of the conduit fitting 64. In addition, the first flange section 68 defines a first contact surface 82 and the second flange section 70 includes a second contact surface 86.

The floating seal insert 66 is partially inserted into the conduit fitting 64 until the first disc-shaped contact surface 94 contacts a disc-shaped surface inside the first counterbore 106 of the conduit fitting 64. Furthermore, the conduit fitting 64 includes a disc-shaped contact surface 87. The surfaces 82, 86, and 87 are configured to engage a mounting surface of a component (e.g., BOP 31 or 50), which receives bolts through the bolt receptacles 80 and 84. While the tunable conduit fitting assembly 60 is mounted to the component, the floating seal insert 66 is able to move (e.g., float) along an axial range of motion 89 within the conduit fitting 64 and the component. For example, one seal disposed within the groove 104 maintains a floating seal with the conduit fitting 64, while another seal disposed within the groove 102 maintains a floating seal with the component (e.g., BOP 31 or 50). The floating seal insert 66 also dampens shockwaves in the fluid flow, as discussed further below.

Figure 5:
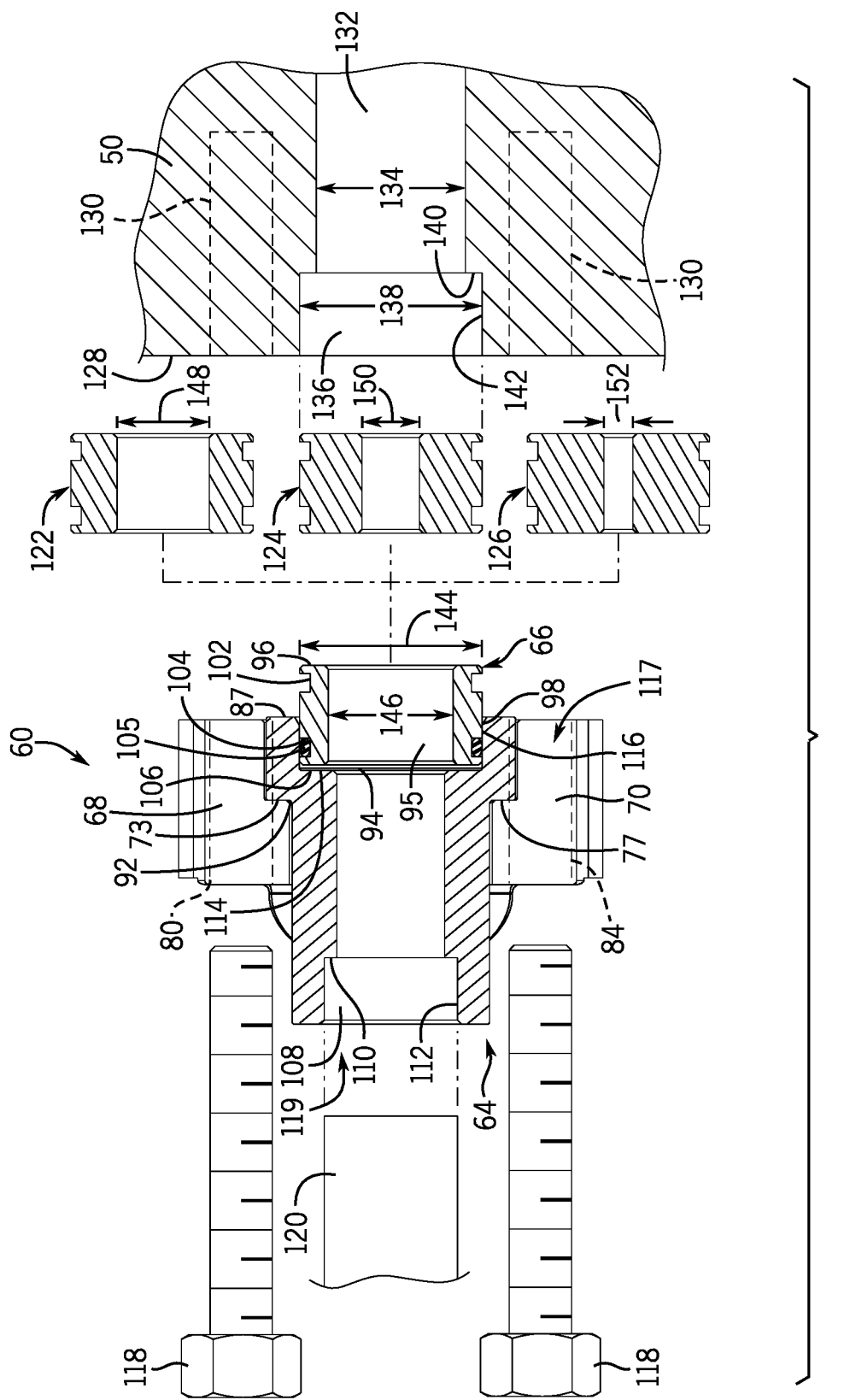
FIG. 5 is a cross-sectional side view of an embodiment of the tunable conduit fitting assembly of FIGS. 2-4, illustrating the tunable conduit fitting assembly exploded from a BOP, a conduit, and three alternative shock-dampening floating seal inserts tuned to different fluid dynamics (e.g., expected shockwaves) of the mineral extraction system.

FIG. 5 is an exploded cross-sectional side view of an embodiment of the tunable conduit fitting assembly 60 exploded from the BOP 50 and a hose 120, further illustrating alternative fluid-dynamic tuning floating seal insert (e.g., shock-dampening floating seal inserts) 122, 124, and 126 that may be selectively used instead of the floating seal insert 66. As previously discussed, in the present embodiment, the hose 120 is a hydraulic hose. However, in other embodiments, the hose 120 may be any flexible or rigid fluid conduit. As discussed below, each floating seal insert 66, 122, 124, and 126 may be tuned to specific fluid dynamics, such as shockwave characteristics (e.g., frequency, wavelength, and/or amplitude), flow rates, turbulence, and so forth. Thus, each floating seal insert 66, 122, 124, and 126 may have different characteristics (e.g., number, shape, and pattern, such as a spiral or helix pattern) of internal fluid passages to control the fluid dynamics. Before discussing details of these inserts 122, 124, and 126, a mounting arrangement of the tunable conduit fitting assembly 60 is discussed in context of the BOP 50 and the conduit 120.

The shock-dampening floating seal inserts 66, 122, 124, and 126 are selectively mounted into the first counterbore 106 of the conduit fitting 64. As illustrated, the first counterbore 106 of the conduit fitting 64 includes a disc-shaped surface 114 and an annular surface 116, wherein the disc-shaped surface 114 is generally crosswise (e.g., perpendicular) to the annular surface 116. Similarly, the second counterbore 108 of the conduit fitting 64 includes a disc-shaped surface 110 and an annular surface 112, wherein the disc-shaped surface 110 is generally crosswise (e.g., perpendicular) to the annular surface 112. The floating seal insert 66 is inserted into the conduit fitting 64 until the first disc-shaped contact surface 94 contacts the disc-shaped surface 114 of the first counterbore 106. Furthermore, one or more annular seals 105 (e.g., O-rings) are placed within the grooves 104 to create a floating seal between the insert 66 and the fitting 64. The annular seal 105 contacts the annular surface 116 of the first counterbore 106, and slides along the annular surface 116 during axial movement of the insert 66 in the fitting 64. As discussed below, one or more annular seal (e.g., O-rings) are also placed within each of the one or more grooves 102 to create a floating seal between the insert 66 and the BOP 50. The annular seal 105 may be made of an elastomer or metal (e.g., a piston ring). If the floating seal insert 66 is made of graphite-filled PTFE, the annular seal 105 may have a cross section that is square, rectangular, circular, oval, rectangular, tapered, etc. Though only one annular seal 105 is shown within the groove 104, it should be understood, that in some embodiments, multiple annular seals 105 may be disposed within each of the one or more grooves 102, 104. In an embodiment with multiple annular seals 105 in each of the grooves 102, 104, the annular seals 105 may be the same and/or different from one another (e.g., the same and/or different in shape, material, hardness, etc.), or the same.

The conduit fitting assembly 60 may be configured for attachment to a face 128 of the BOP 50. The BOP 50 may define bolt receptacles 130 for receiving bolts 118, a bore 132 having a diameter 134, and a counterbore 136 having a diameter 138 greater than the diameter 134. During mounting, the bolts 118 are inserted through the bolt receptacles 80 and 84 of the conduit fitting assembly 60 and into the bolt receptacles 130, which may be threaded to create a threaded connection with the bolts 118. The counterbore 136 includes a disc-shaped surface 140 and an annular surface 142. The disc-shaped surface 140 is generally crosswise (e.g., perpendicular) to the annular surface 142. The counterbore 136 is configured to receive a portion of the floating seal insert 66, including the groove 102 and an annular seal (e.g., O-ring), such that the floating seal insert 66 maintains a floating seal inside the counterbore 136. Furthermore, the diameter 138 of the counterbore 136 may be equal to or slightly larger than a diameter 144 of the floating seal insert 66 to enable axial movement of the floating seal insert 66 within the counterbore 136. The range of axial movement (e.g., float) of the floating seal insert 66 is limited by the disc-shaped surface 114 in the conduit fitting 64 and the disc-shaped surface 140 in the BOP 50. For example, the range of axial movement may range between approximately 1 to 50, 1 to 40, 1 to 30, 1 to 20, or 1 to 10 percent of the length of the floating seal insert 66.

In addition, the shock-dampening fluid passage 95 of the floating seal insert 66 defines a diameter 146 tuned to the fluid dynamics in the mineral extraction system 10 and/or the BOP 50. One unique feature of the floating seal insert 66 is the ability to dampen shockwaves in the fluid flow, particularly tuned to the fluid dynamics for more effective dampening. A shockwave may be described as a propagating disturbance in the fluid flow, e.g., a high-pressure disturbance or wave that flows at a high velocity through the fluid flow. For example, the shockwave may include water hammer, which may include a pulse of multiple high-pressure waves in the fluid passage. However, the floating seal insert 66 is not limited to shock dampening. The shock-dampening fluid passage 95 may be tuned to the fluid dynamics for a variety of reasons, including but not limited to dampening shockwaves. For example, the fluid passage 95 may be sized and/or shaped (e.g., different diameter 146) to produce specific fluid dynamics desired in the mineral extraction system 10 and/or the BOP 50. Accordingly, the floating seal inserts 122, 124, 126 include different interior diameters 148, 150, and 152 configured to enable tuning of the conduit fitting assembly 60 to different fluid dynamics in the mineral extraction system 10 and/or the BOP 50. These different embodiments of the floating seal inserts 66, 122, 124, 126 demonstrate that the diameter can vary significantly from the bore diameter 132 depending on the desired fluid dynamic characteristic being tuned.

In particular, shockwaves can be particularly harmful to the BOP 50, conduits, hoses, and fittings. The shockwaves have characteristics including frequencies, wavelengths, and amplitudes. These characteristics indicate the strength, and destructive power, of the shockwaves. The floating seal inserts 66, 122, 124, and 126 are configured to dampen and/or absorb energy of the shockwaves, wherein each insert 66, 122, 124, and 126 is particularly effective for different shockwave characteristics (e.g. frequencies, ranges of frequencies, amplitude, etc.). For example, the floating seal insert 66 may be tuned to dampen and/or absorb energy of a first shockwave (e.g., first frequency, wavelength, and/or amplitude), the floating seal insert 122 may be tuned to dampen and/or absorb energy of a second shockwave (e.g., second frequency, wavelength, and/or amplitude), the floating seal insert 124 may be tuned to dampen and/or absorb energy of a third shockwave (e.g., third frequency, wavelength, and/or amplitude), and the floating seal insert 126 may be tuned to dampen and/or absorb energy of a fourth shockwave (e.g., fourth frequency, wavelength, and/or amplitude). By tuning the conduit fitting assembly 60 to these shockwaves, the shock-dampening floating seal inserts 66, 122, 124, and 126 effectively protect the control valves, regulators, flow meters, conduits, fittings, BOP 50, and other features along the fluid flow path. One advantage of this protection is the ability to use less bulky equipment, conduits, and fittings, because there is no longer a threat of damage from the expected shockwaves.

Figure 6:
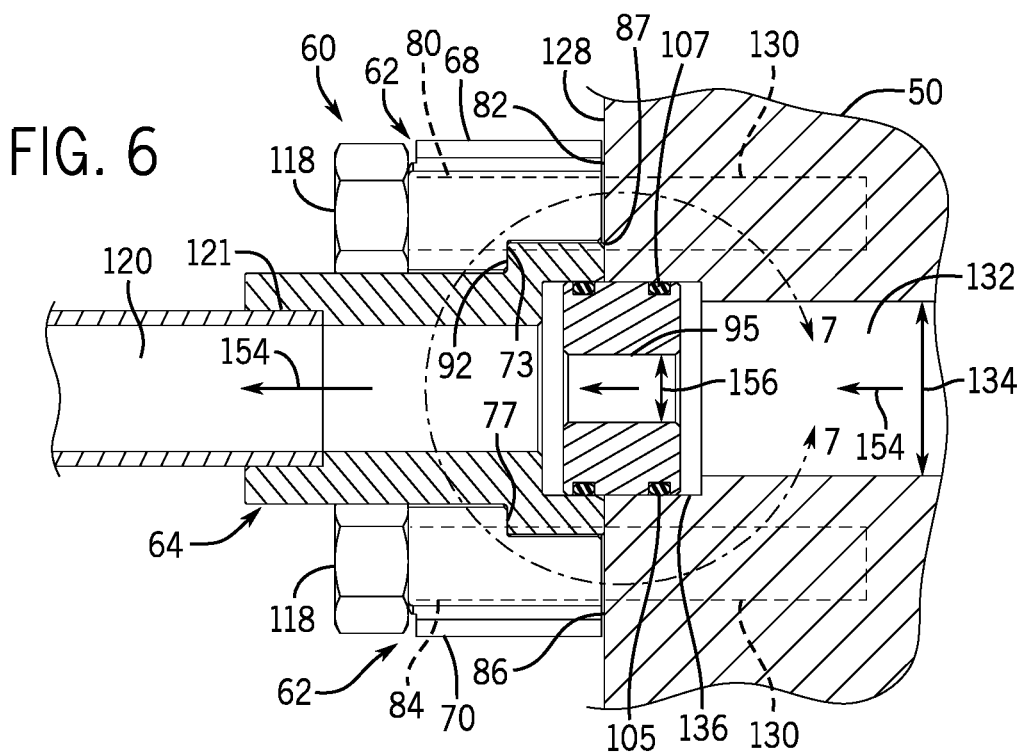
FIG. 6 is a cross-sectional side view of an embodiment of the tunable conduit fitting assembly of FIG. 5, illustrating the tunable conduit fitting assembly coupled to the BOP and the conduit.

FIG. 6 is a cross-sectional side view of an embodiment of the tunable conduit fitting assembly 60 of FIG. 5, illustrating the tunable conduit fitting assembly 60 coupled to the BOP 50 and the conduit 120. As illustrated, the bolts 118 extend through the bolt receptacles 80 and 82 of the respective first and second flange sections 68 and 70, and thread into the bolt receptacles 130 of the BOP 50. As the bolts 118 thread into the receptacles 130, the bolts 118 pull the conduit fitting assembly 60 against the BOP 50. Eventually, the bolts 118 bias the first contact surface 82 of the first flange section 68 and the second contact surface 86 of the second flange section 70 against the face 128 of the BOP 50. Furthermore, as the bolts 118 pull the flange sections 68 and 70 against the face 128, the first flange 73 of the first flange section 68 and the second flange 77 of the second flange section 70 contact and the flange 92 of the conduit fitting 64 to bias the conduit fitting 64 toward the face 128 of the BOP 50. As a result, the bolts 118 bias the disc-shaped contact surface 87 of the conduit fitting 64 against the face 128.

As further illustrated in FIG. 6, the conduit 120 may be coupled to the second counterbore 108 of the conduit fitting 64 via an interface 121. For example, the interface 121 may include a welded joint, a brazed joint, an adhesive coupling, a threaded connection, an interference fit, a shrink-fit, or any combination thereof. The conduit 120 may include a rigid or flexible conduit, such as a metal conduit, a rubber conduit, or a plastic conduit. In the illustrated embodiment, the floating seal insert 66 is disposed between the conduit fitting assembly 60 and the BOP 50. However, in certain embodiments, a floating seal insert 66 may be disposed between the conduit 120 and the conduit fitting assembly 60. For example, a first floating seal insert 66 may be disposed between the conduit 120 and the conduit fitting assembly 60, and a second floating seal insert 66 may be disposed between the BOP 50 (or another component) and the conduit fitting assembly 60. In such an embodiment, the first floating seal insert 66 may be tuned to a first fluid dynamic characteristic (e.g. frequencies, ranges of frequencies, amplitude, etc.) and the second floating seal insert 66 may be tuned to a second fluid dynamic characteristic (e.g. frequencies, ranges of frequencies, amplitude, etc.).

The floating seal insert 66 creates a movable (e.g., floating) seal between the insert 66 and both the fitting 60 and the BOP 50. As illustrated, the floating seal insert 66 includes the annular seal 105 axially movable in the first counterbore 106 of the conduit fitting 64 and an annular seal 107 axially movable in the counterbore 136 of the BOP 50. In operation, the floating seal insert 66 is able to move axially in a cylindrical cavity 153 defined by the counterbores 106 and 136. For example, if the system is subject to vibration or shockwaves, then the floating seal insert 66 is able to maintain a seal despite movement of the components.

Furthermore, the floating seal insert 66 is tuned to the system to dampen shockwaves and/or improve other fluid dynamics. The illustrated system includes a flow path 154 extending through the BOP 50, the conduit fitting assembly 60, and the conduit 120. In the illustrated embodiment, the diameter 134 of the bore 132 of the BOP 50 is larger than a diameter 156 of the shock-dampening fluid passage 95 of the conduit-fitting insert 66. For example, the diameter 156 may be specifically sized to dampen shockwaves expected in the system, e.g., based on testing. This ability to completely or substantially absorb the shockwave allows for greater reliability of the BOP 50 by preserving the control valves, regulators, flow meters, conduits, fittings, and various connections. Although the flow path 154 is illustrated as traveling from the BOP 50 toward the conduit 120, the shock-dampening floating seal insert 66 also functions in the reverse flow direction.

Figure 7:
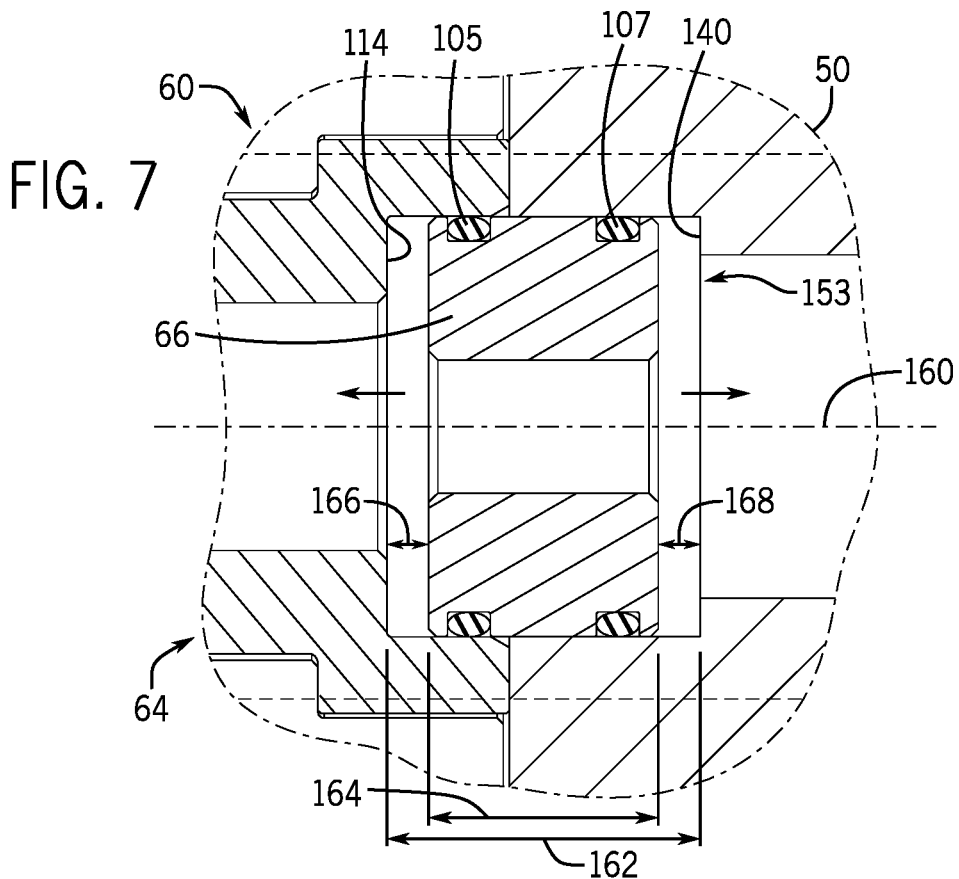
FIG. 7 is a partial cross-sectional side view of an embodiment of the tunable conduit fitting assembly of FIG. 6, illustrating an axial range of motion (e.g., float) of the shock-dampening floating seal insert.

FIG. 7 is a partial cross-sectional side view of an embodiment of the tunable conduit fitting assembly 60 of FIG. 6, illustrating an axial range of motion (e.g., float) along an axis 160 of the shock-dampening floating seal insert 66. As illustrated, an axial length 162 of the cylindrical cavity 153 is greater than an axial length 164 of the floating seal insert 66, thereby leaving an axial gap represented by a first axial gap 166 and a second axial gap 168. As a result, the floating seal insert 66 is free to move (e.g., float) along the axis 160 between the disc-shaped surface 114 in the counterbore 106 and the disc-shaped surface 140 in the counterbore 136. In certain embodiments, the axial length 162 may be greater than the axial length 164 by at least approximately 1 to 500 percent, 5 to 100 percent, or 10 to 50 percent. However, the ratio of these lengths 164 and 164 may vary depending on the desired degree of axial play (e.g., gaps 166 and 168) in the system. In certain embodiments, a first spring may be placed in the axial gap 166 and/or a second spring may be placed in the axial gap 168. The springs may be configured to dampen shock or vibration of the floating seal insert 66, while also providing a cushion between the floating seal insert 66 and the disc-shaped surfaces 114 and 140.

FIG. 8 is a cross-sectional side view of an embodiment of a fluid-dynamic tuning floating seal insert (e.g., a shock-dampening floating seal insert) 200 of FIGS. 2-7, illustrating a stepped internal passage 201 tuned to certain fluid dynamics in the mineral extraction system 10. The floating seal insert 200 includes annular grooves 202 configured to accept annular seals (e.g., O-rings). These annular seals enable the floating seal insert 200 to maintain a seal despite movement of the insert 200. In the illustrated embodiment, the stepped internal passage 201 includes a plurality of bores of different diameters, e.g., a first cylindrical bore 204 and a second cylindrical bore 206. The bore 204 has a smaller diameter and a greater length than the bore 206. Alternatively, the bore 204 may have a larger diameter and/or a shorter length than the bore 206. In certain embodiments, the stepped internal passage 201 may include 2 to 100, 2 to 10, or 2 to 5 bores of different diameters. The diameters may progressively increase from one side to another, or the diameters may alternatingly increase and decrease from one side to another. The stepped internal passage 201 may be specifically tuned to the mineral extraction system, 10, such that the stepped internal passage 201 is able to control fluid dynamics (e.g., dampen shockwaves, improve fluid flow, control mixing, etc.).

FIG. 9 is a cross-sectional side view of an embodiment of a fluid-dynamic tuning floating seal insert (e.g., a shock-dampening floating seal insert) 220 of FIGS. 2-7, illustrating a diverging internal passage 221 tuned to certain fluid dynamics in the mineral extraction system 10. The floating seal insert 220 includes the annular grooves 202 configured to accept annular seals (e.g., O-rings). These annular seals enable the floating seal insert 220 to maintain a seal despite movement of the insert 220. In the illustrated embodiment, the diverging internal passage 221 includes a conical bore 222 that progressively decreases in diameter from a first side 224 to a second side 226 of the insert 220. The bore 222 has a smaller diameter 228 at the first side 224 and a larger diameter 230 at the second side 224. Alternatively, the bore 222 may have a larger diameter 228 at the first side 224 and a smaller diameter 230 at the second side 226. In the illustrated embodiment, the diverging internal passage 221 is defined by a single conical bore 222. In other embodiments, the diverging internal passage 221 may include a plurality of diverging or converging bores 222, e.g., between 2 to 100, 2 to 10, or 2 to 5 conical bores having different angles. For example, the angles of the conical bores may progressively increase or decrease between the first side 224 and the second side 226. The diverging internal passage 221 may be specifically tuned to the mineral extraction system, 10, such that the diverging internal passage 221 is able to control fluid dynamics (e.g., dampen shockwaves, improve fluid flow, control mixing, etc.).

FIG. 10 is a cross-sectional side view of an embodiment of a fluid-dynamic tuning floating seal insert (e.g., a shock-dampening floating seal insert) 240 of FIGS. 2-7, illustrating a converging-diverging internal passage 241 tuned to certain fluid dynamics in the mineral extraction system 10. The floating seal insert 240 includes the annular grooves 202 configured to accept annular seals (e.g., O-rings). These annular seals enable the floating seal insert 240 to maintain a seal despite movement of the insert 240. In the illustrated embodiment, the converging-diverging internal passage 241 includes a converging conical bore 242, a cylindrical bore 244, and a diverging conical bore 246 between first and second sides 248 and 250. The converging conical bore 242 may include one or more conical bores that progressively increase in diameter from the first side 248 toward the cylindrical bore 244, whereas the diverging conical bore 246 may include one or more conical bores that progressively decrease in diameter from the cylindrical bore 244 toward the second side 250. In the illustrated embodiment, the conical bores 242 and 246 are mirror images of one another (e.g., same length, angle, etc.). In certain embodiments, the conical bores 242 and 246 may be different from one another, e.g., different axial lengths, different taper angles, different starting and ending diameters, or any combination thereof. Furthermore, each conical bores 242 and 246 may include a plurality of conical bores of progressively changing taper angles. The converging-diverging internal passage 241 may be specifically tuned to the mineral extraction system, 10, such that the converging-diverging internal passage 241 is able to control fluid dynamics (e.g., dampen shockwaves, improve fluid flow, control mixing, etc.).

FIG. 11 is a front view of an embodiment of a fluid-dynamic tuning floating seal insert (e.g., a shock-dampening floating seal insert) 260 of FIGS. 2-7, illustrating a set of three internal passages 262 tuned to certain fluid dynamics in the mineral extraction system 10. As illustrated, the internal passages 262 are equally spaced about an axis 264 of the insert 260. In other embodiments, the internal passages 262 may be distributed in a non-uniform spacing. The illustrated internal passages 262 also have a uniform diameter 266. However, other embodiments may include different diameters 266 for the three internal passages 262. Although the insert 260 includes only three internal passages 262, the insert 260 may include any number of internal passages, e.g., 2 to 100. The set of three internal passages 262 may be specifically tuned to the mineral extraction system, 10, such that the set of three internal passages 262 is able to control fluid dynamics (e.g., dampen shockwaves, improve fluid flow, control mixing, etc.).

FIG. 12 is a front view of an embodiment of a fluid-dynamic tuning floating seal insert (e.g., a shock-dampening floating seal insert) 280 of FIGS. 2-7, illustrating a set of seven internal passages 281 tuned to certain fluid dynamics in the mineral extraction system 10. As illustrated, the passages 281 include a central passage 282 surrounded by six equally spaced passages 284, wherein the central passage 282 has a diameter 286 larger than a diameter 288 of the surrounding passages 284. In other embodiments, the passages 281 may be non-uniformly spaced, e.g., the passages 284 may be disposed at different radial distances 290 from the central passage 282 and/or the passages 284 may be disposed at different offset distances 292 from one another. In another embodiment, the central passage 282 may have a diameter 286 smaller than the diameter 288 of the surrounding passages 284 and/or the diameter 288 may vary among the passages 284. Although the illustrated insert 280 includes seven internal passages 281, the insert 280 may include any number of internal passages, e.g., 2 to 100. The set of seven internal passages 281 may be specifically tuned to the mineral extraction system, 10, such that the set of seven internal passages 281 is able to control fluid dynamics (e.g., dampen shockwaves, improve fluid flow, control mixing, etc.).

In certain embodiments, each of the tunable floating seal inserts 66 may be selectively installed in a variety of tunable conduit fitting assemblies 60, which may include a variety of fitting shapes (e.g., straight fitting, bend fitting, split fitting, etc.), connection types (e.g., threads, interference fit, crimp coupling, welded connection, flange coupling, etc.), materials (e.g., metal, plastic, ceramic, etc.), or any combination thereof. For example, as previously discussed, tunable floating seal inserts 66 may be used with a hydraulic hose fitting to reduce or eliminate shock in hoses 120 in the BOP or elsewhere in the tree 22 in order to prevent hoses from jumping. Typically, hydraulic hoses 120 in the tree 22 are connected at either end using 37-degree flare Joint Industry Council (JIC) fittings, which utilize a threaded metal-to-metal connection. Hydraulic shock in the hoses 120 can potentially cause movement (e.g., jumping) of the hose 120, which can in turn cause the JIC hose fittings to "back off" (unthread), loosen the connection, and open leak paths (e.g., gaps) that can result in fluid leakage. By replacing the threaded JIC fittings at the end of hydraulic hoses in the BOP, and elsewhere in the tree 22, with hose fittings configured to interface with the previously described tunable conduit fitting assembly 60 with floating seal inserts 66, the quality of the seal may be improved, reducing or eliminating hose jumping and/or leakage.

Figure 13:
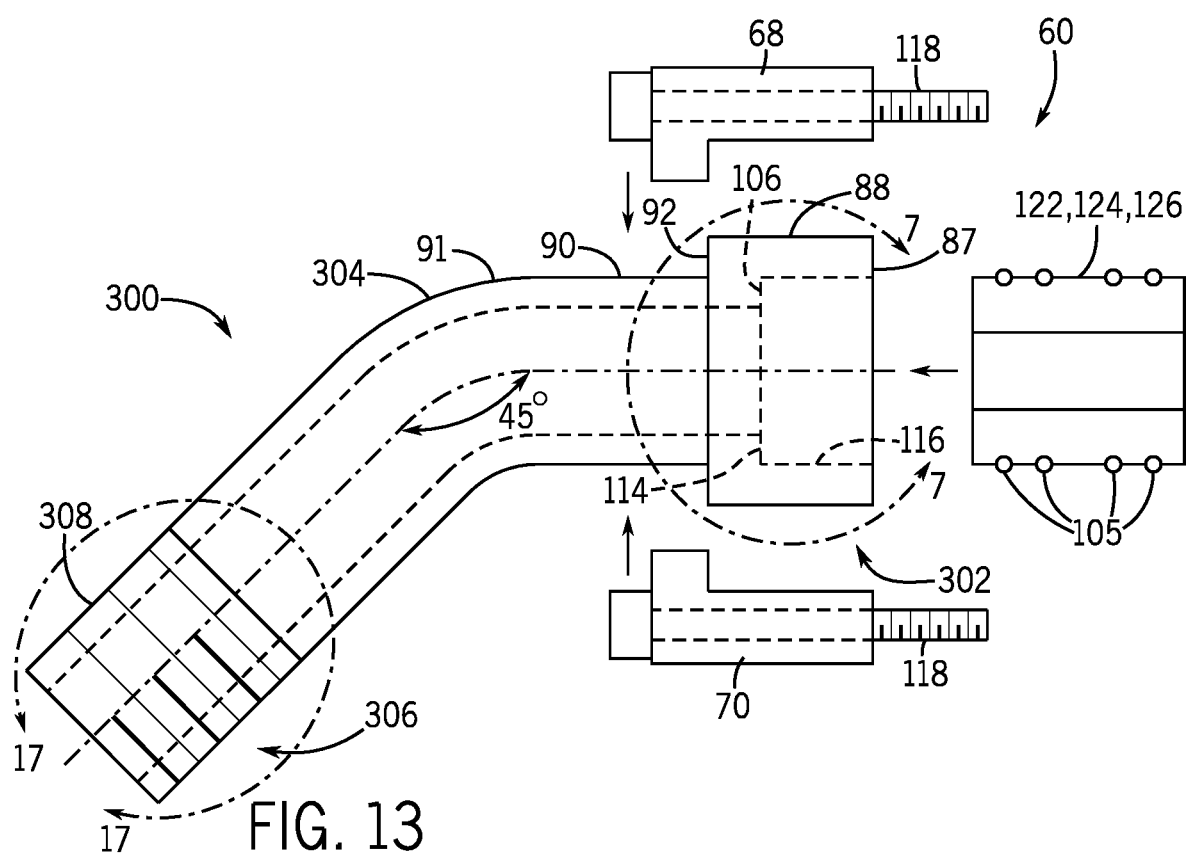
FIG. 13 is a side view of an embodiment of a tunable conduit fitting assembly having an acutely angled hose fitting with a threaded end.
Figure 23:
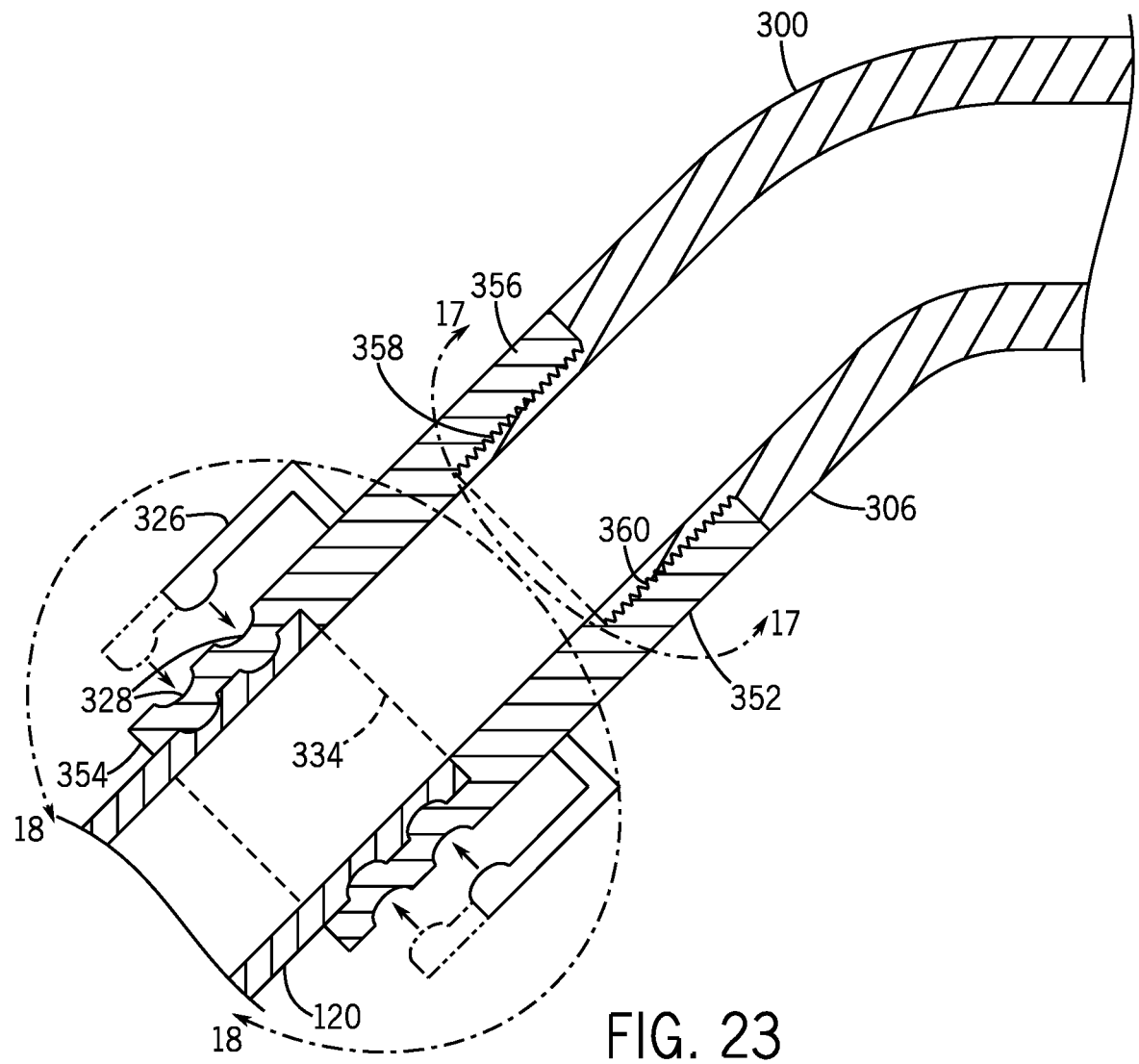
FIG. 23 is a section side view of an adapter fitting interface between the end portion of the hose and the end portion of the hose fitting, and a tool used to compress and crimp the parts together.

FIG. 13 is a side view of one embodiment of a tunable conduit fitting assembly having an acutely angled hose fitting 300 with a bend between first and second couplings or end portions 302, 306. As discussed with regard to FIGS. 3-5, the fitting 300 has a first end portion 302 with a first cylindrical exterior surface 88 and a second cylindrical exterior surface 90 (e.g., defining a body 91), separated by an intermediate flange 92. The first cylindrical exterior surface 88 terminates in a disc-shaped contact surface 87 that contacts an exterior surface of the object to which the fitting 300 is being attached (e.g. the face 128 of the BOP 50, as shown in FIG. 5). The first end portion 302 of the fitting 300 may include a first counterbore 106. The first counterbore 106 may be defined circumferentially by an annular surface 116 and defined axially by a disc-shaped surface 114. The first counterbore 106 may be configured to receive one of the floating seal inserts 122, 124, 126, which may be outfitted with one or more annular seals 105. The intermediate flange 92 may interface with the first and second flange sections 68, 70, which may be held in place with bolts 118. The body 91 of the fitting 300 may include a bend 304. In the embodiment shown, the bend is a 45-degree bend. However, other bends may be possible. For example, the body 91 of the fitting 300 may include a bend 304 of less than, equal to, or greater than approximately 10, 15, 20, 25, 30, 35, 40, 45, 50, 55, 60, 65, 70, 75, 80, 85, or 90 degrees. Similarly, the bend 304 may be between 5 and 85 degrees, between 10 and 75 degree, between 25 and 65 degrees, between 35 and 55 degrees, between 40 and 50 degrees, or any other angle. Furthermore, some embodiments of the fitting 300 may not have a bend 304 at all. A second end portion 306 of the fitting 300, opposite the first end portion 302, may be configured to attach to a hose 120, either directly or via an adapter fitting (FIG. 23). In the embodiment shown in FIG. 13, the second end portion 306 of the fitting has a cylindrical threaded surface 308 configured to interface with the end portion of the hose 120, or an adapter fitting (as described with regard to FIG. 23), for connecting the fitting 300 to the end portion of the hose 120. In the embodiment shown, the cylindrical threaded surface 308 is a male threaded connection. In alternative embodiments, the second end portion 306 of the fitting 300 may include a female threaded connection. In such an embodiment, the cylindrical threaded surface 308 may be on an interior surface of the fitting 300 rather than an exterior surface of the fitting 300.

The hose fitting 300 may be made of Polyether ether ketone (PEEK), elastomer, stainless steel, fire resistant elastomer, graphite-filled polytetrafluoroethylene (PTFE), nylon, aluminum bronze, naval brass, and the like. In some embodiments, the floating seal inserts 122, 124, 126 may be integrally formed in the body 91 of the hose fitting 300. For example, the hose fitting 300 and the floating seal inserts 122, 124, 126 may be a one-piece structure that is integrally formed or molded. Fabrication may be in layers, by thermal bonding, or by lamination. In some embodiments, the hose fitting 300, the floating seal inserts 122, 124, 126 or both, may have different portions made of different materials. The different portions may have different coefficients of thermal expansion, different degrees of hardness, different degrees of stiffness, different degrees of elasticity, or any combination thereof. The multiple portions may be coupled together. The coupling may involve permanent coupling (e.g., molding, thermal fusion, diffusion bonding, lamination, adhesives), threaded joints, teeth, grooves, interference fits, etc.

The first counterbore 106 may be configured to receive a floating seal insert 122, 124, 126. The floating seal insert 122, 124, 126 may be equipped two sets of one or more annular seals 105. As previously described, the floating seal insert 122, 124, 126 may be selected to damp one or more shockwaves having one or more characteristics (e.g. frequencies, ranges of frequencies, amplitude, etc.) in order to prevent the hoses from jumping and to prevent uncoupling at either end portion. The hose fitting 300 and the floating seal insert 122, 124, 126 may be coupled to (e.g., held against) a BOP 50 or other component by first and second flange 68, 70 and bolt 118 assemblies.

Figure 14:
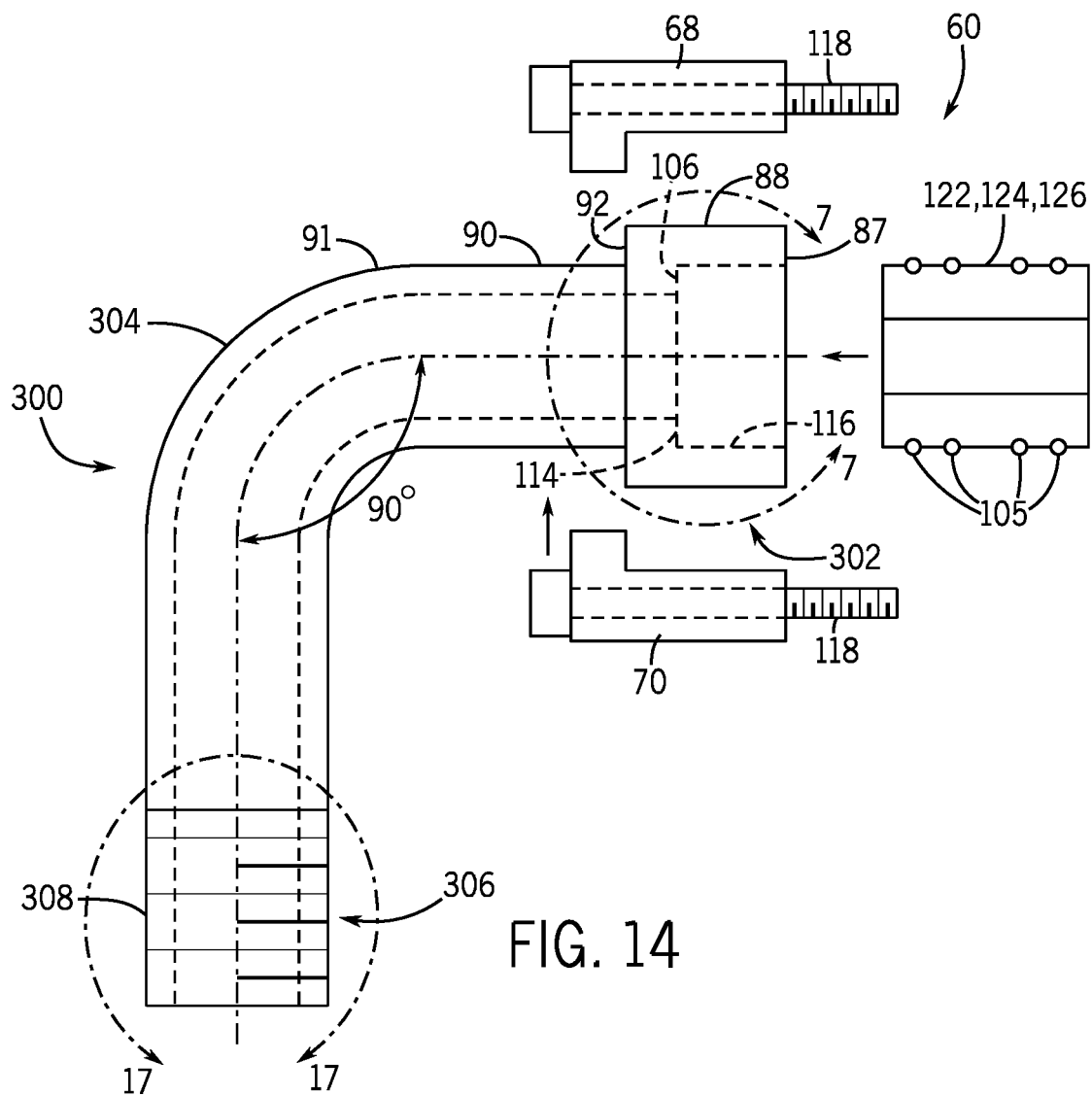
FIG. 14 is a side view of an embodiment of the tunable conduit fitting assembly having a hose fitting with a 90-degree bend and a threaded end.
Figure 15:
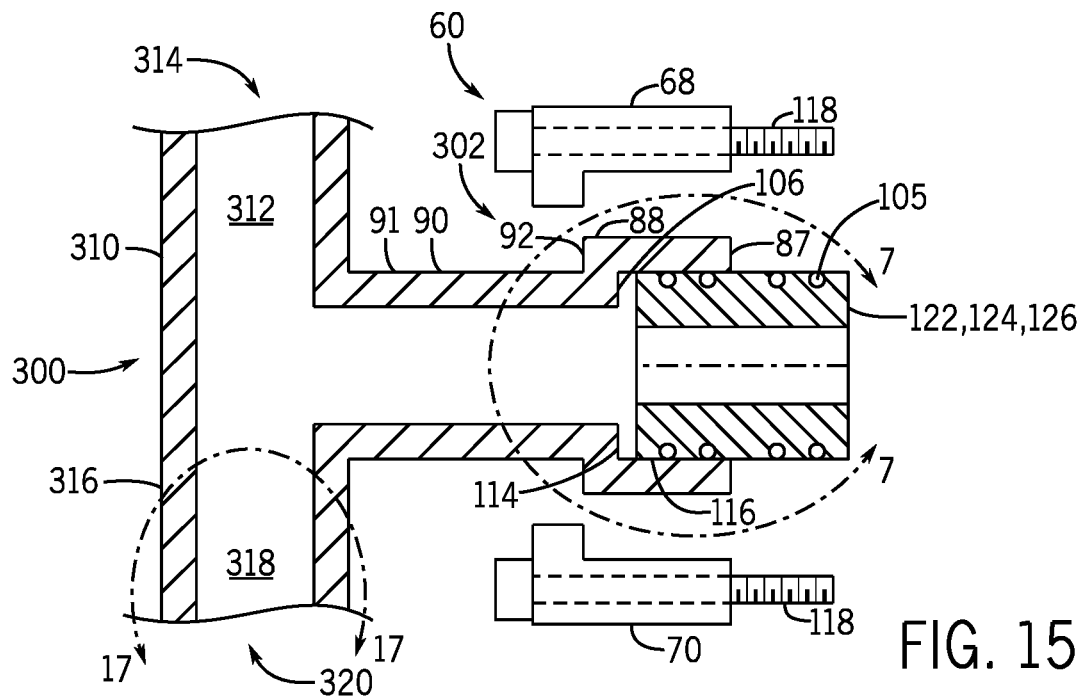
FIG. 15 is a section side view of an embodiment of a tunable conduit fitting assembly having a T-shaped hose fitting or splitter.
Figure 16:
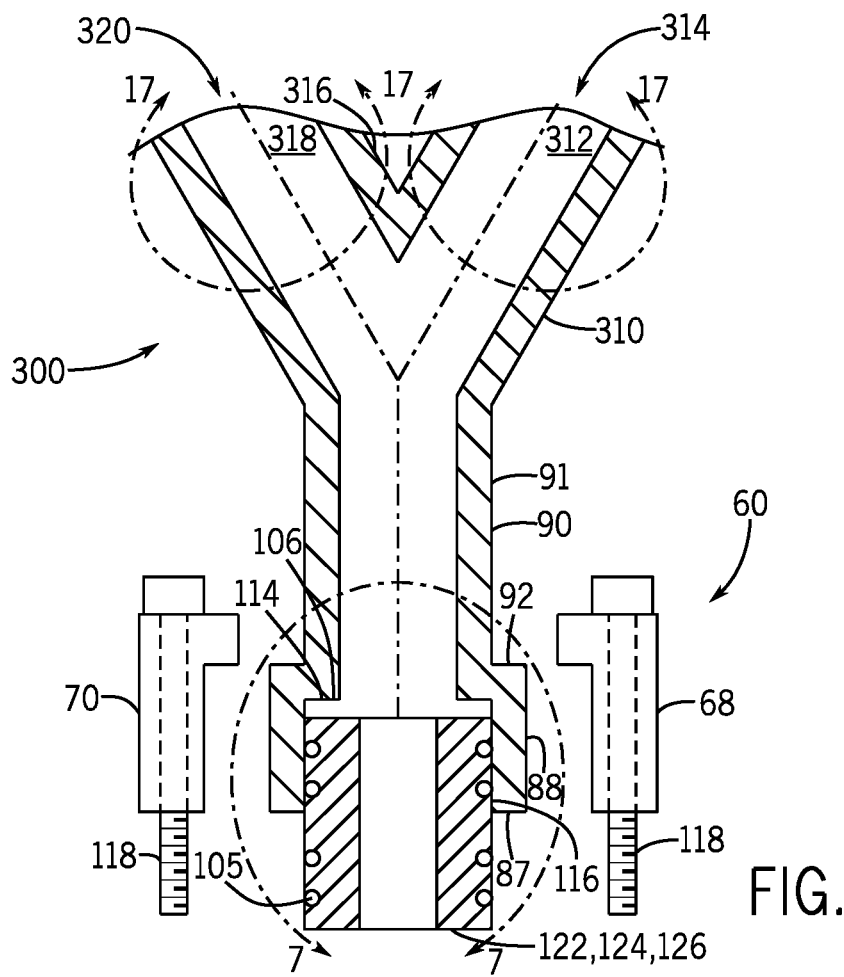
FIG. 16 is a section side view of an embodiment of a tunable conduit fitting assembly having a Y-shaped hose fitting or splitter.

FIG. 14 is a side view of one embodiment of a tunable conduit fitting assembly having a 90-degree hose fitting 300 with a threaded end portion 308. Though FIGS. 13 and 14 show hose fittings 300 with an acute bend and a 90 degree bend, respectively, it should be understood that the hose fitting 300 may have a bend of any angle. For example, the body 91 of the fitting 300 may include a bend 304 of less than, equal to, or greater than approximately 10, 15, 20, 25, 30, 35, 40, 45, 50, 55, 60, 65, 70, 75, 80, 85, or 90 degrees. Similarly, the bend 304 may be between 5 and 85 degrees, between 10 and 75 degree, between 25 and 65 degrees, between 35 and 55 degrees, between 40 and 50 degrees, or any other angle. As with the acutely angled hose fitting 300 discussed with regard to FIG. 13, the fitting 300 has a first end portion 302 with a first cylindrical exterior surface 88 and a second cylindrical exterior surface 90 (e.g., a body), separated by an intermediate flange 92. The first cylindrical exterior surface 88 terminates in a disc-shaped contact surface 87 that contacts the exterior surface of the object to which the fitting 300 is being attached (e.g. the face 128 of the BOP 50, as shown in FIG. 5). The first end portion 302 includes a first counterbore 106 defined circumferentially by the annular surface 116 and defined axially by the disc-shaped surface 114. The first counterbore 106 may be configured to receive one of the floating seal inserts 122, 124, 126, which may be outfitted with one or more annular seals 105. The intermediate flange 92 may interface with the first and second flange sections 68, 70, which may be held in place with bolts 118. The body 91 of the fitting 300 may include a 90-degree bend 304. It should be understood, however, that bends of varying degrees may be possible. For example, the body 91 of the fitting 300 may include a bend 304 of less than, equal to, or greater than approximately 60, 65, 70, 75, 80, 85, 90, 95, 100, 105, 110, 115, or 120 degrees. Similarly, the bend 304 may be between 60 and 120 degrees, between 70 and 110 degree, between 80 and 100 degrees, or any other angle. Some embodiments of the fitting 300 may not have a bend 304 at all. A second end portion 306 of the fitting 300, opposite the first end portion 302, may be configured to attach, directly or indirectly, to a hose 120. In the embodiment shown in FIG. 14, the cylindrical threaded surface 308 is a male threaded connection. In other embodiments, the second end portion 306 of the fitting 300 may include a female threaded connection, wherein the cylindrical threaded surface 308 is disposed on an interior surface of the fitting 300 rather than an exterior surface of the fitting 300. The first counterbore 106 may be configured to receive a floating seal insert 122, 124, 126. The floating seal insert 122, 124, 126 may be equipped two sets of one or more annular seals 105. As previously described, the floating seal insert 122, 124, 126 may be selected to damp one or more shockwaves having one or more characteristics (e.g. frequencies, ranges of frequencies, amplitude, etc.) in order to prevent the hoses from jumping and to prevent uncoupling at either end portion. The hose fitting 300 and the floating seal insert 122, 124, 126 may be coupled to (e.g., held against) a BOP 50 or other component by first and second flange 68, 70 and bolt 118 assemblies. The hose fitting 300 may also be configured to interface with a plurality of hoses or conduits 120 at one or more ends. For example, FIGS. 15 and 16 show exploded section side views of T-shaped and Y-shaped hose fittings 300 or splitters, respectively. It should be understood, however, that other hose fittings 300 of other shapes are possible. Specifically, FIG. 15 is a section side view of an embodiment of a tunable conduit fitting assembly 60 having a T-shaped hose fitting 300. The hose fitting 300 has a first end portion 302 with a first cylindrical exterior surface 88 and a second cylindrical exterior surface 90 (e.g., defining a body 91), separated by an intermediate flange 92. The first cylindrical exterior surface 88 terminates in a disc-shaped contact surface 87 that contacts an exterior surface of the object to which the fitting 300 is being attached (e.g. the face 128 of the BOP 50, as shown in FIG. 5). The first end portion 302 of the fitting 300 may include a first counterbore 106. The first counterbore 106 may be defined circumferentially by an annular surface 116 and defined axially by a disc-shaped surface 114. The first counterbore 106 may be configured to receive one of the floating seal inserts 122, 124, 126, which may be outfitted with one or more annular seals 105. The intermediate flange 92 may interface with the first and second flange sections 68, 70, which may be held in place with bolts 118. The body 91 of the fitting 300 may be T-shaped such that the a third cylindrical surface 310 having a third bore 312 extends outward from the second cylindrical surface 90 toward a second end portion 314, such that the third cylindrical surface 310 is substantially transverse to the second cylindrical surface 90. Similarly a fourth cylindrical surface 316 having a fourth bore 318 extends outward from the second cylindrical surface 90 toward a third end portion 320, opposite the second end portion 314, such that the fourth cylindrical surface 316 is substantially transverse to the second cylindrical surface 90. One or more hoses or conduits 120 may be coupled to each of the second end portion 314 and the third end portion 320 in any number of ways (e.g., threads, crimping, welding, clamping, outward expansion, etc.). Specific embodiments are shown and discussed with regard to FIGS. 18-23.

FIG. 16 is a section side view of an embodiment of a tunable conduit fitting assembly having a Y-shaped hose fitting 300 or splitter. The hose fitting 300 has a first end portion 302 with a first cylindrical exterior surface 88 and a second cylindrical exterior surface 90 (e.g., defining a body 91), separated by an intermediate flange 92. The first cylindrical exterior surface 88 terminates in a disc-shaped contact surface 87 that contacts an exterior surface of the object to which the fitting 300 is attached (e.g. the face 128 of the BOP 50, as shown in FIG. 5). The first end portion 302 of the fitting 300 may include a first counterbore 106. The first counterbore 106 may be defined circumferentially by an annular surface 116 and defined axially by a disc-shaped surface 114. The first counterbore 106 may be configured to receive one of the floating seal inserts 122, 124, 126, which may be outfitted with one or more annular seals 105. The intermediate flange 92 may interface with the first and second flange sections 68, 70, which may be held in place with bolts 118. The body 91 of the fitting 300 may be Y-shaped. That is, rather than extending outward from the second cylindrical surface 90 in a direction substantially transverse to the second cylindrical surface 90, the third and fourth cylindrical surfaces 310 may extend away from the second cylindrical surface 90 at an acute angle. The third cylindrical surface 310 may have a third bore 312 that extends outward from the second cylindrical surface 90 at an acute angle toward a second end portion 314. Similarly, the fourth cylindrical surface 316 may have a fourth bore 318 that extends outward from the second cylindrical surface 90 at an acute angle toward a third end portion 320. One or more hoses or conduits 120 may be coupled to each of the second end portion 314 and the third end portion 320 in any number of ways (e.g., threads, crimping, welding, clamping, outward expansion, etc.). Specific embodiments are shown and discussed with regard to FIGS. 18-23.

Figure 17:
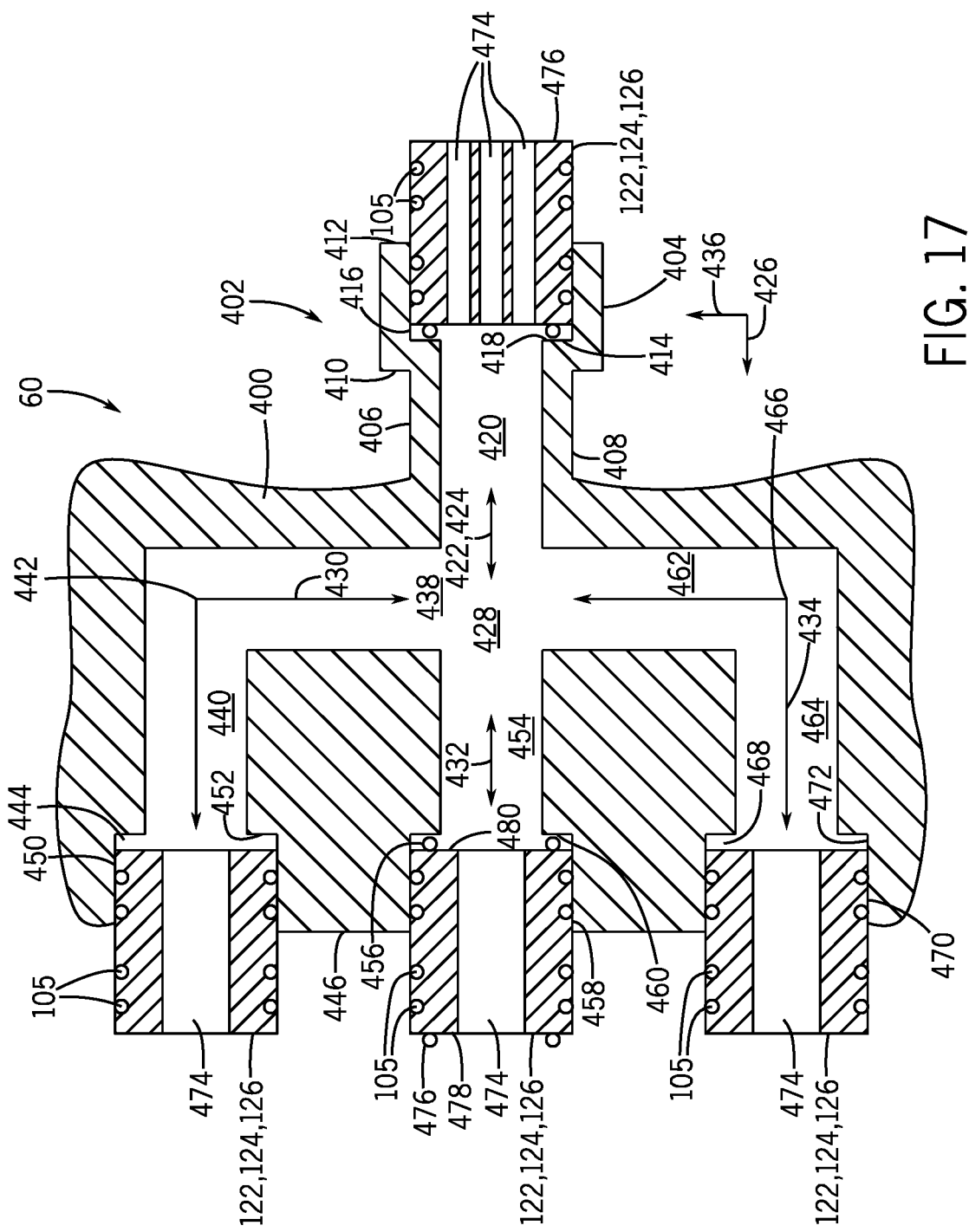
FIG. 17 is a section side view of an embodiment of a tunable conduit fitting assembly having a manifold with multiple shock-dampening floating seal inserts.

FIG. 17 is a section side view of an embodiment of a tunable conduit fitting assembly 60 having a manifold 400 (e.g., intake or exhaust manifold) with multiple shock-dampening floating seal inserts 122, 124, 126. FIGS. 15 and 16 illustrated how a tunable conduit fitting assembly 60 may interface with multiple fluid lines 120 via a Y-shaped or T-shaped hose fitting 300. In other embodiments, a manifold 400 may be used to provide any number of intake ports and/or exhaust ports with annular seal 105 interfaces. The manifold 400 has a first end portion 402 with a first cylindrical exterior surface 404 and a second cylindrical exterior surface 406 (e.g., defining a body 408), separated by an intermediate flange 410. The first cylindrical exterior surface 404 terminates in a disc-shaped contact surface 412 that contacts an exterior surface of the object to which the manifold 400 is attached to (e.g. the face 128 of the BOP 50, as shown in FIG. 5). The first end portion 402 of the manifold 400 may include a first counterbore 414. The first counterbore 414 may be defined circumferentially by an annular surface 416 and defined axially by a disc-shaped surface 418. The first counterbore 416 may be configured to receive one of the floating seal inserts 122, 124, 126, which may be outfitted with one or more annular seals 105. For example, one or more of the floating seal inserts 122, 124, 126 may include a first plurality of seals 105 that are axially offset from a second plurality of seals 105. The first plurality of seals 105 may be disposed on a first portion of the floating seal insert 122, 124, 126 inside of the manifold 400 or hose fitting 300, and the second plurality of seals 105 may be disposed on a second portion of the first floating seal insert 122, 124, 126 outside of the manifold 400 or hose fitting 300. The intermediate flange 410 may interface with the first and second flange sections 68, 70, (as shown in FIGS. 15 and 16) which may be held in place with bolts 118. A first bore 420 through the manifold 400, which may be substantially coaxial with the first counterbore 414 may define a first portion 422 of a fluid flow path 424 through the manifold 400. As shown, the first portion 422 of the fluid flow path extends from the first end portion 402 of the manifold 400 in an axial direction 426. Fluid flow along the flow path 424 may be in either direction (e.g., forward or backward). At a junction 428, the first portion 422 of the fluid flow path 424 splits into a second portion 430 of the fluid flow path 424, a third portion 432 of the fluid flow path 424, and a fourth portion 434 of the fluid flow path 424. It should be understood, however, that the first portion 422 of the flow path 424 may be split into any number of flow path portions. For example, the first portion 422 of the flow path 424 may be split into 2, 3, 4, 5, 6, 7, 8, 9, 10, 11, 12, 13, 14, 15, 18, 20, or more flow paths. In the embodiment shown, the second portion 430 of the flow path 424 extends in a radial direction 436 outward from the first bore 420 through a second bore 438. The second bore 438 may intersect a third bore 440 extending in the axial direction, such that the second portion 430 of the fluid flow path 424 through the second and third bores 438, 440 includes a turn 442. The third bore 440 extends through the body 408 of the manifold 400 in the axial direction from the second bore 438 to a second counterbore 444. The second counterbore 444 extends axially 426 from a face 446 of the manifold 400, at a second end portion 448 of the manifold 400, into the body 408 of the manifold 400. The second counterbore 444 may be defined circumferentially by a second annular surface 450 and defined axially by a second disc-shaped surface 452. The second counterbore 444 may be configured to receive one of the floating seal inserts 122, 124, 126, which may be outfitted with one or more annular seals 105.

The third portion 432 of the flow path 424 extends in the axial direction 426 from the first bore 420 through a fourth bore 454. The first bore 420 and the fourth bore 454 may be substantially aligned (e.g., coaxial) with one another. Indeed, the first bore 420 and the fourth bore 454 may be formed in the same machining operation. The fourth bore 454 extends through the body 408 of the manifold 400 in the axial direction 426 from the first bore 420 and the junction 428 to a third counterbore 456. The third counterbore 456 extends axially 426 from the face 446 of the manifold 400, at the second end portion 448 of the manifold 400, into the body 408 of the manifold 400. The third counterbore 456 may be defined circumferentially by a third annular surface 458 and defined axially by a third disc-shaped surface 460.

The third counterbore 456 may be configured to receive one of the floating seal inserts 122, 124, 126, which may be outfitted with one or more annular seals 105.

The fourth portion 434 of the flow path 424 extends in the radial direction 436 outward from the first bore 420, opposite the second portion 430 of the flow path 424, through a fifth bore 462. The fifth bore 462 may intersect a sixth bore 464, which extends in the axial direction 426, such that the fourth portion 434 of the fluid flow path 424 through the fifth and sixth bores 462, 464 includes a turn 466. The sixth bore 464 extends through the body 408 of the manifold 400 in the axial direction 426 from the fifth bore 462 to a fourth counterbore 468. The fourth counterbore 468 extends axially 426 from a face 446 of the body 408 of the manifold 400, at a second end portion 448 of the manifold 400, into the body 408 of the manifold 400. The fourth counterbore 468 may be defined circumferentially by a fourth annular surface 470 and defined axially by a fourth disc-shaped surface 472. The fourth counterbore 468 may be configured to receive one of the floating seal inserts 122, 124, 126, which may be outfitted with one or more annular seals 105.

The floating seal inserts 122, 124, 126 may each include one or more fluid passages 474. Additionally, the fluid passages 474 through each floating seal insert 122, 124, 126 may be of different configurations (e.g., different sizes, numbers, shapes, patterns, or any combination thereof), such that each floating seal insert 122, 124, 126 may be selected for the fluid dynamics of the hose or conduit 120 it is in fluid communication with. In some embodiments, one or more of the floating seal inserts 122, 124, 126 may be outfitted with one or more circular face seals 476 disposed on the front face 478 or rear face 480 of the floating seal insert 122, 124, 126. The face seal 476 may form a seal with the disc shaped surfaces 412, 452, 460, 472 of the body 408 of the manifold 400.

Though the manifold 400 in FIG. 17 defines a fluid flow path 424 through substantially straight bores 420, 438, 440, 454, 462, 464 that extend in the axial 426 or radial 436 directions, in other embodiments, the bores 420, 438, 440, 454, 462, 464 may be of various shapes, and define one or more flow paths 424 of various shapes (curved, diagonal, tapered) in the body 408 of the manifold 400. Similarly, though FIG. 17 shows turns 442, 434 as substantially right angled turns, in other embodiments, the turns 442, 434 may be of acute or obtuse angles. Furthermore, turns 442, 434 may be smooth, gradual turns defined by a radius.

Though the fittings 300 shown in FIGS. 13 and 14 interface with the hose 120 via a threaded connection, in other embodiments, the fitting 300 may be attached to the end portion of the hose 120 in a number of other ways. FIGS. 18-23 show section side views of multiple embodiments illustrating several possible ways to couple the conduit and/or hose 120 to the end portion 306 of the hose fitting 300. The illustrated coupling techniques include a threaded connection, a crimped connection, an outward expansion connection, a clamped connection, a socket weld end connection, a butt weld, and an adapter fitting. All of the disclosed coupling techniques may be used together in any combination on each fitting. It should be understood, however that other techniques for coupling the conduit or hose 120 to the end portion 306 of the hose fitting 300 may be possible.

Figure 18:
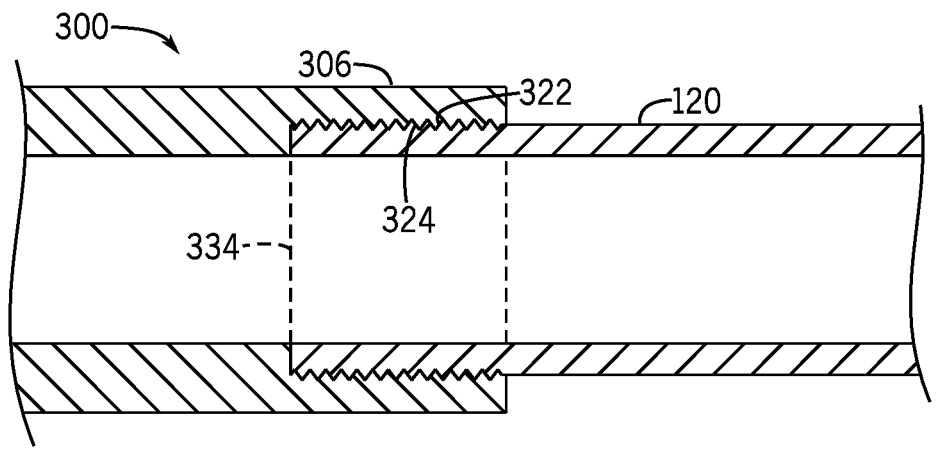
FIG. 18 is a section side view of a threaded interface between an end portion of the hose and an end portion of the hose fitting.

FIG. 18 is a section side view of a threaded interface between an end portion 334 of the hose 120 and the end portion 306 of the hose fitting 300. In the embodiment shown, the end portion 306 of the hose fitting 300 includes an interior threaded surface 322 (e.g., female threads) and the end portion 334 of the hose 120 includes an exterior threaded surface (e.g., male threads). The end portion 334 of the hose 120 is inserted into the end portion 306 of the hose fitting and rotated until the exterior threaded surface 324 of the hose 120 engages with the interior threaded surface 322 of the hose fitting 300. The hose 120 and the hose fitting 300 may be rotated relative to one another until the connection is tight. Though in the embodiment shown in FIG. 18, the hose 120 has the exterior threaded surface 324 and the hose fitting has the interior threaded surface 322, it should be understood that the hose may have the interior threaded surface 322, and the hose fitting 300 may have the exterior threaded surface 324. Furthermore, as discussed below with regard to FIG. 23, in some embodiments, an adapter fitting may be disposed between the hose 120 and the hose fitting 300.

Figure 19:
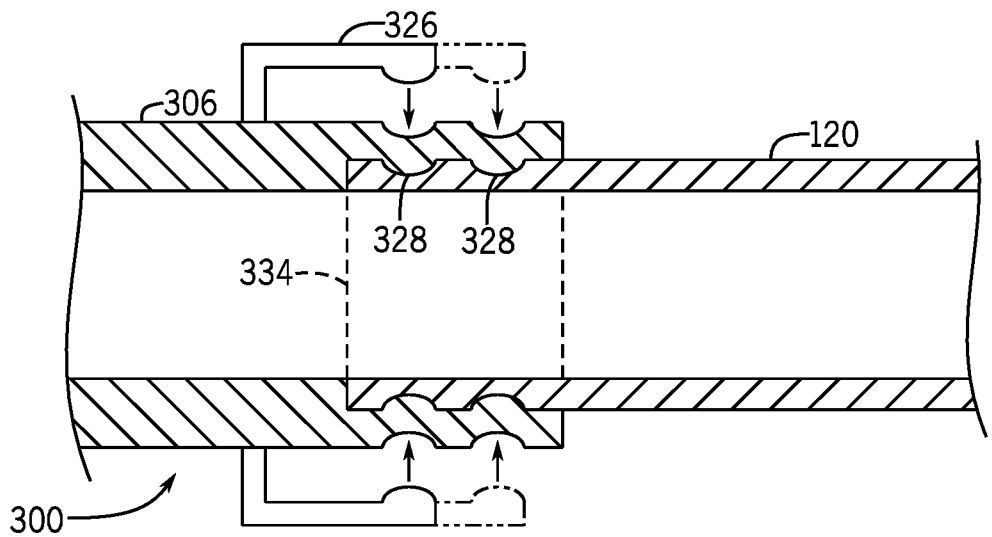
FIG. 19 is a section side view of a crimped interface between the end portion of the hose and the end portion of the hose fitting.

FIG. 19 is a section side view of a crimped interface between the end portion 334 of the hose 120 and the end portion 306 of the hose fitting 300. In the embodiment shown, the end portion 334 of the hose 120 may be inserted into the end portion 306 of the hose fitting 300. A crimping tool 326 may be used to deform the end portion 306 of the hose fitting 300, forming crimps 328. The crimps 328 may or may not extend around the circumference of the hose fitting 300. The crimps 328 may be annular crimps, or circumferentially spaced crimps, or both. The crimps 328 may also include axially spaced crimps. In the embodiment shown in FIG. 19, two adjacent sets of crimps 328 are made at the end portion 306 of the hose fitting 300. It should be understood, however, that the crimping tool 326 may be used to make any number of crimps 328. For example, crimped interface may include 1, 2, 3, 4, 5, 6, 7, 8, 9, 10, or more crimps 328. Furthermore, rather than the hose 120 being inserted into the hose fitting 300, the hose fitting 300 may be inserted into the hose 120. As discussed below with regard to FIG. 23, in some embodiments, an adapter fitting may be disposed between the hose 120 and the hose fitting 300.

Figure 20:
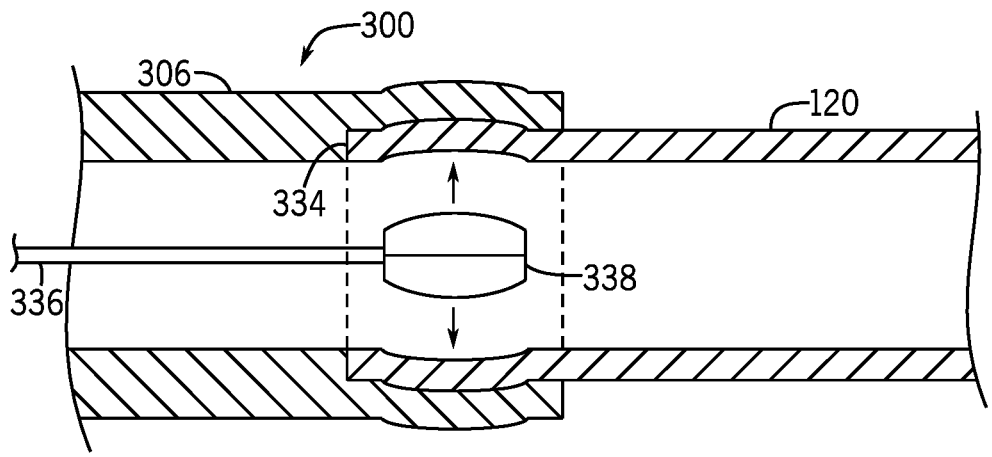
FIG. 20 is a section side view of an outward expansion interface between the end portion of the hose and the end portion of the hose fitting, as well a tool to expand and create the expansion joint.

FIG. 20 is a section side view of an outward expansion interface between the end portion 334 of the hose 120 and the end portion 306 of the hose fitting 300. In the embodiment shown, the end portion 334 of the hose 120 may be inserted into the end portion 306 of the hose fitting 300. An expansion tool (e.g., a threaded rod) may be used to cause an expanding component 338, disposed inside the hose 120 and the hose fitting 300, to expand. The expanding component 338 may press the hose 120 outward against the hose fitting 300 such that relative movement between the hose 120 and the hose fitting 300 is resisted by friction. Rather than the hose 120 being inserted into the hose fitting 300, the hose fitting 300 may be inserted into the hose 120. As discussed below with regard to FIG. 23, in some embodiments, an adapter fitting may be disposed between the hose 120 and the hose fitting 300.

Figure 21:
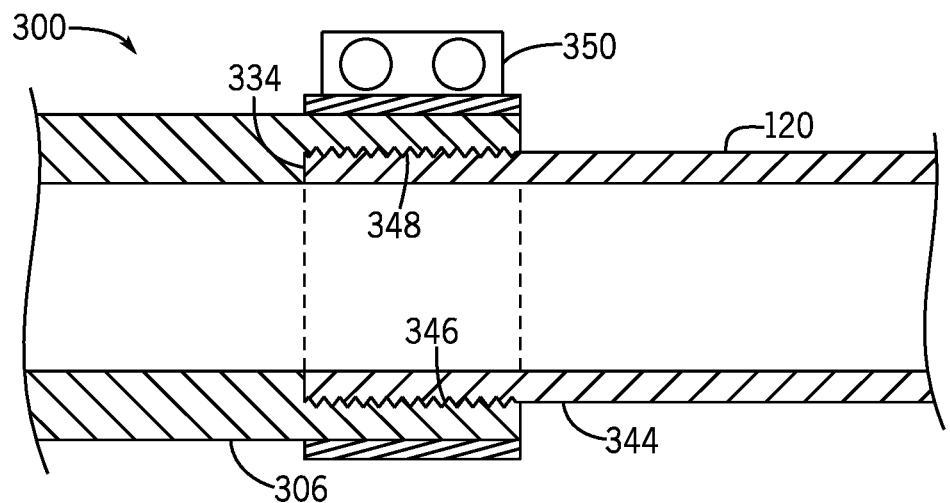
FIG. 21 is a section side view of a clamped interface between the end portion of the hose and the end portion of the hose fitting.

FIG. 21 is a section side view of a clamping interface between the end portion 334 of the hose 120 and the end portion 306 of the hose fitting 300. In the embodiment shown, the exterior surface 344 of the hose 120, or the interior surface 346 of the hose fitting 300, or both, have a non-smooth surface 348 (e.g., a textured surface, grooves, ribs, protrusions, dimples, and/or teeth). In some embodiments the the exterior surface 344 of the hose 120 and the interior surface 346 of the hose fitting 300 may be equipped with coannular teeth and grooves that mate with one another. The end portion 334 of the hose 120 may be inserted into the end portion 306 of the hose fitting 300. A clamp 350 may then be placed over the end portion 306 of the hosing fitting 300 and tightened such that the exterior surface 344 of the hose 120 and the interior surface 346 of the hose fitting 300 frictionally engage (e.g., via the teeth 348) to resist relative movement. As with previously discussed embodiments, rather than the hose 120 being inserted into the hose fitting 300, the hose fitting 300 may be inserted into the hose 120. Additionally, in some embodiments, an adapter fitting may be disposed between the hose 120 and the hose fitting 300.

Figure 22:
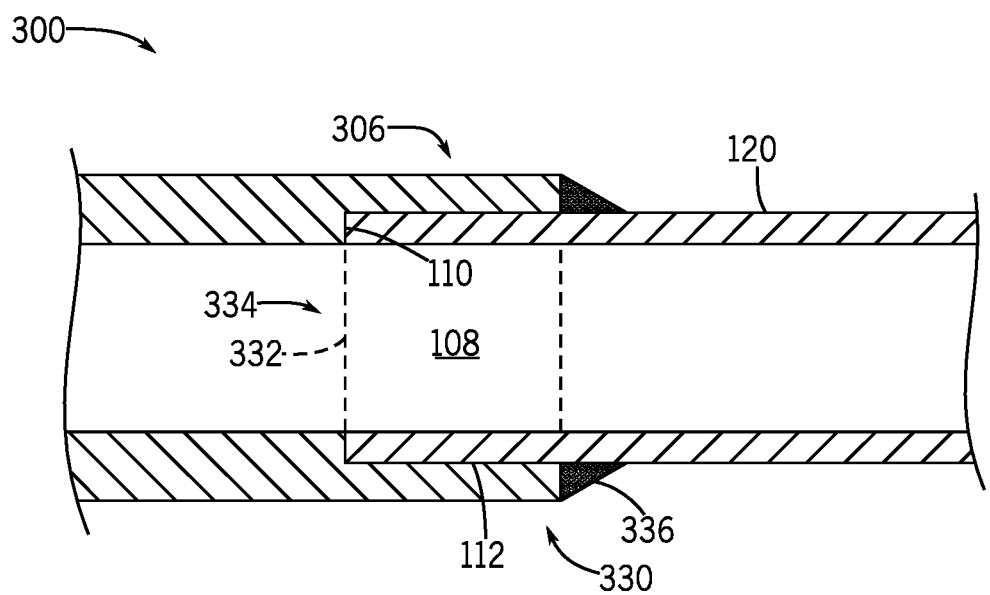
FIG. 22 is a section side view of a thermal joining interface between the end portion of the hose and the end portion of the hose fitting.

FIG. 22 is a section view of a hose-fitting interface 330 utilizing a thermal joining process that causes materials to melt together, diffusion bond together, or a combination thereof, with or without additional material (e.g., filler material). Examples include welding (butt and socket), brazing, diffusion bonding, etc. As was shown and discussed with regard to FIG. 5, the second end portion 306 of the fitting 300 may include a second counterbore 108, defined axially by a disc-shaped surface 110, and defined circumferentially by an annular surface 112. In other embodiments, the interface 330 may include a butt weld. The hose 120 may be inserted into the second counterbore 108 until a disc-shaped surface 332 at an end portion 334 of the hose 120 contacts the disc-shaped surface 110 of the fitting 300. A weld 336 or other bond may then be deposited between the hose 120 and the second end portion 306 of the fitting 300 such that the hose 120 is coupled to the fitting 300 and resists relative movement. As with previously discussed embodiments, rather than the hose 120 being inserted into the hose fitting 300, the hose fitting 300 may be inserted into the hose 120. Additionally, in some embodiments, an adapter fitting may be disposed between the hose 120 and the hose fitting 300.

FIG. 23 is a section side view of an adapter fitting 352 interface between the end portion 334 of the hose 120 and the end portion 306 of the hose fitting 300. In the embodiment shown, the adapter fitting 352 includes a first end portion 354 and a second end portion 356. The first end portion 354 is coupled to the end portion 334 of the hose 120. The second end portion 356 is coupled to the end portion 306 of the hose fitting. In the embodiment shown in FIG. 23, the first end portion 354 of the adapter fitting 352 is coupled to the end portion 334 of the hose 120 via a crimped interface, as shown and discussed with regard to FIG. 19. Specifically, the end portion 334 of the hose 120 may be inserted into the first end portion 354 of the adapter fitting 352. The crimping tool 326 may be used to deform the first end portion 354 of the adapter fitting 352, forming crimps 328. The crimps 328 may or may not extend around the circumference of the adapter fitting 352. In the embodiment shown in FIG. 23, two adjacent sets of crimps 328 are made at the first end portion 354 of the adapter fitting 352. It should be understood, however, that the crimping tool 326 may be used to make any number of crimps 328. For example, crimped interface may include 1, 2, 3, 4, 5, 6, 7, 8, 9, 10, or more crimps 328.

The second end portion 356 of the adapter fitting 352 couples to the end portion 306 of the hose fitting 300 via a threaded interface, as shown and discussed with regard to FIG. 18. Specifically, the second end portion 356 of the adapter fitting 352 includes an interior threaded surface 358 (e.g., female threads) and the end portion 306 of the hose fitting 300 includes an exterior threaded surface (e.g., male threads). The end portion 306 of the hose fitting 300 is inserted into the second end portion 356 of the adapter fitting 352 and rotated until the exterior threaded surface 360 of the hose fitting 300 engages with the interior threaded surface 358 of the adapter fitting 352. The hose fitting 300 and the adapter fitting 352 may be rotated relative to one another until the connection is tight. Though in the embodiment shown in FIG. 23, the hose fitting 300 has the exterior threaded surface 360 and the adapter fitting 352 has the interior threaded surface 358, the hose fitting 300 may have the interior threaded surface 358, and the adapter fitting 352 may have the exterior threaded surface 360. Though FIG. 23 shows a crimped interface at the first end portion 354 of the adapter fitting 352 and a threaded interface at the second end portion 356 of the adapter fitting 352, any of the interface techniques shown and described above (e.g., threads, crimping, expander fitting, clamping, welding, bonding, brazing), or any other coupling technique may be used to at either end 354, 356 of the adapter fitting 352 to couple the adapter fitting 352 to the hose 120 or the hose fitting 300.

Figure 24:
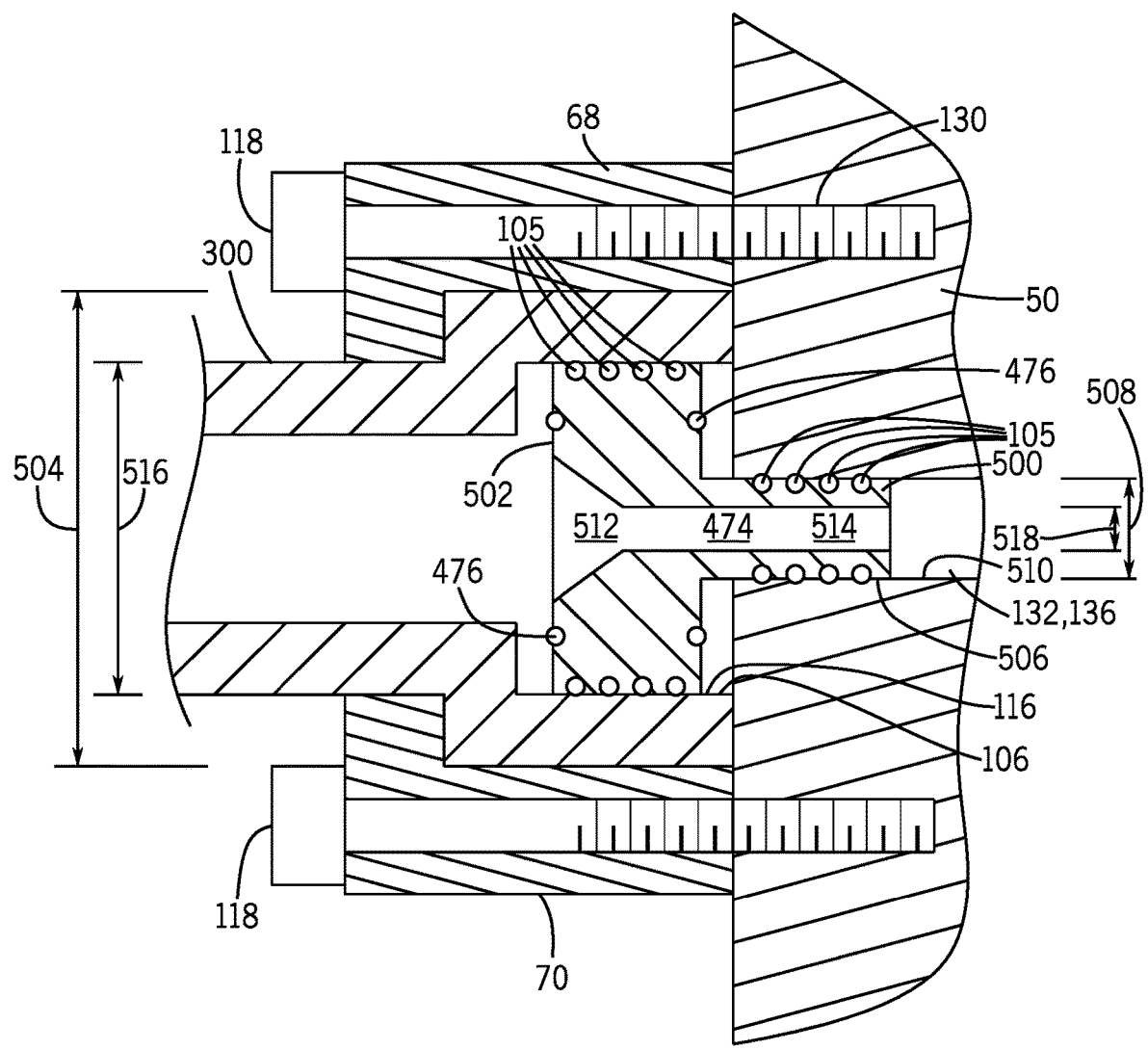
FIG. 24 is a section side view of an embodiment of a tunable conduit fitting assembly having a shock-dampening floating seal insert with multiple diameters.

Though the floating seal inserts 122, 124, 126 shown and described above have a constant diameter, in other embodiments, a floating seal insert 500 may include a stepped up or stepped down diameter (e.g., gradually changing or stepwise changing). FIG. 24 is a section side view of an embodiment of a tunable conduit fitting assembly having the shock-dampening floating seal insert 500 with multiple diameters. For example, the floating seal insert 500 includes a first cylindrical portion 502 having a first diameter 504 and a second cylindrical portion 506 having a second diameter 508. The floating seal insert 500 may be outfitted with one or more annular seals 105 disposed about the first cylindrical portion 502, the second cylindrical portion 506, or both. The first cylindrical portion 502 may be configured to be inserted into the first counterbore 106 of a hose fitting 300 or other part (e.g., conduit fitting 64, conduit 120, manifold 400, etc.). The diameter 504 of the first cylindrical portion 502 may be set such that the one or more annular seals 105 disposed about the first cylindrical portion 502 form a seal with the annular surface 116 of the hose fitting 300. Similarly, the second cylindrical portion 506 may be configured to be inserted into the bore 132 or counterbore 136 of a BOP 50. The diameter 508 of the second cylindrical portion 506 may be set such that the one or more annular seals 105 disposed about the second cylindrical portion 506 form a seal with the annular surface 510 of the BOP 50 bore 132 or counterbore 136. In the illustrated embodiment, the diameter 504 of the first cylindrical portion 502 is larger than the diameter 508 of the second cylindrical portion 506. However, in other embodiments, the diameter 504 of the first cylindrical portion 502 may be smaller than the diameter 508 of the second cylindrical portion 506 (e.g., greater than or equal to 1.5, 2, 2.5, 3, 3.5, 4, 4.5, or 5 times larger). In other embodiments, the ratio of the diameters 504, 508 may be 1.1 to 5, 1.2 to 4, 1.3 to 2, etc.

The fluid passage 474 through the floating seal insert 500 may also vary in diameter. For example, in the embodiment shown, the fluid passage 474 through the floating seal insert 500 includes a first portion 512 and a second portion 514. In the first portion 512 of the fluid passage 474, the passage 474 tapers from a first passage diameter 516 to a second passage diameter 518. The second portion 514 of the fluid passage has a constant passage diameter 518. It should be understood, that the fluid passage 747 through the floating seal insert 500 may include tapers, steps in diameter, constant diameter portions, or other configurations.

Figure 25:
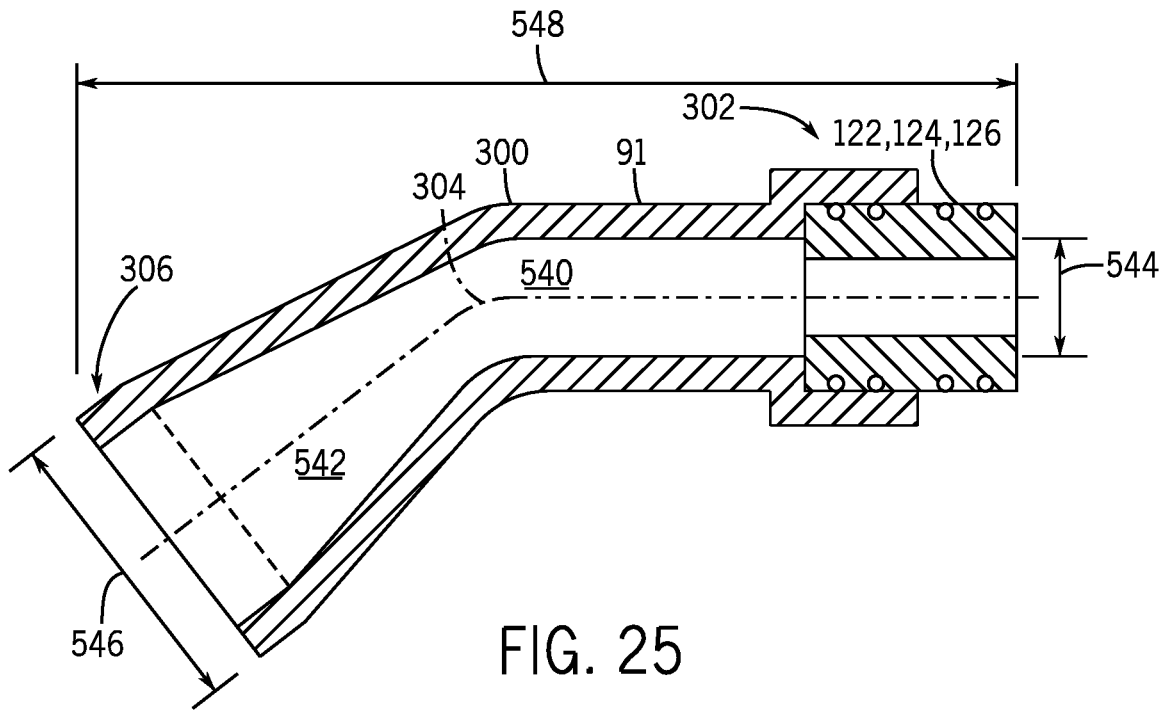
FIG. 25 is a side section view of an embodiment of the tunable conduit fitting assembly having an acutely angled expander hose fitting.

In the embodiments of the hose fitting 300 shown in FIGS. 13 and 14, the diameter of the fluid path through the hose fitting 300 is substantially constant. However, in some embodiments, the diameter of the fluid flow path through hose fitting 300 may expand (e.g., an expanding portion) or reduce (e.g., a reducing portion) across the hose fitting 300. For example, FIG. 25 is a side section view of an embodiment of an acutely angled expander hose fitting 300. A fluid flow path 540 through the hose fitting 300 may be defined by a bore 542 through the body 91 of the hose fitting 300. In some embodiments, the diameter or cross sectional area of the bore 542 may expand or reduce along the length 548 of the hose fitting 300. For example, in the hose fitting 300 shown in FIG. 25, the bore 542 has a first diameter 544 at a first end portion 302 of the hose fitting 300. Along the length 548 of the hose fitting 300, the bore 542 progressively expands to a second diameter 546, which occurs at the second end portion 306 of the fitting. The bore 542 may expand gradually or continuously, as shown in FIG. 25, from the first diameter 544 to the second diameter 546. In other embodiments, the bore 542 may expand from the first diameter 544 to the second diameter 546 in a stepwise manner via a plurality of discrete steps. Though the hose fitting 300 in FIG. 25 includes an acute angle bend 304, in other embodiments, the hose fitting 300 may include a bend of any angle or may not include a bend 304.

Figure 26:
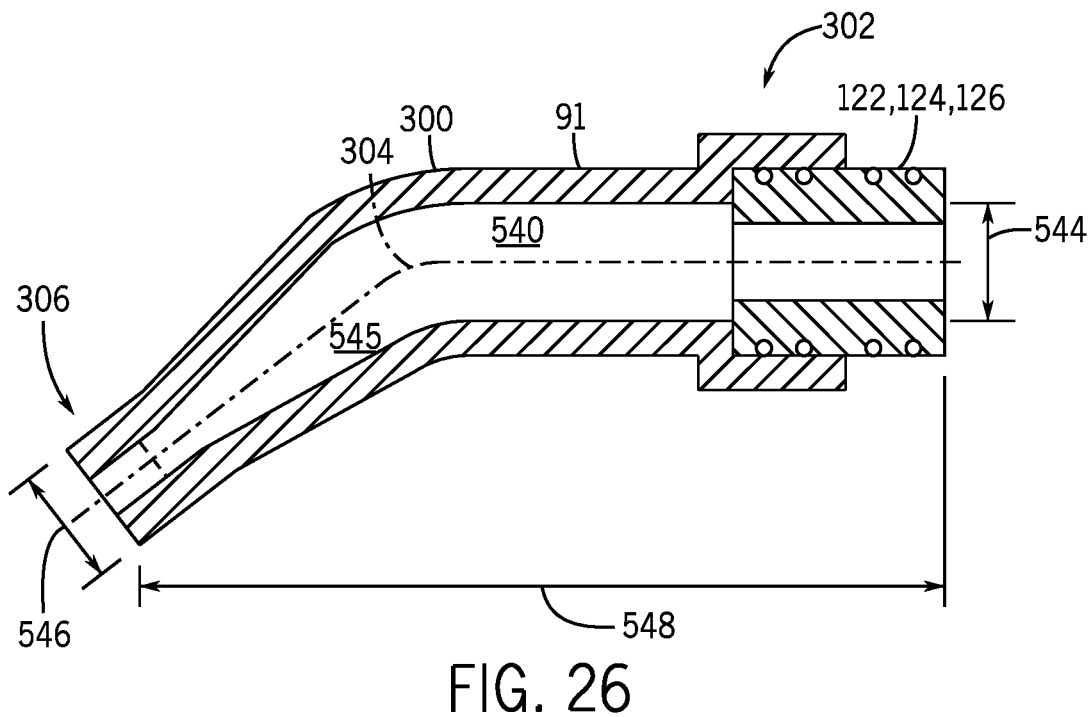
FIG. 26 is a side section view of an embodiment of the tunable conduit fitting assembly having an acutely angled reducer hose fitting.

The cross sectional area of the fluid flow path 540 through the hose fitting 300 may also reduce along the length 548 of the hose fitting 300. For example, FIG. 26 is a side section view of an embodiment of an acutely angled reducer hose fitting 300. The fluid flow path 540 through the hose fitting 300 may be defined by the bore 542 through the body 91 of the hose fitting 300. In the hose fitting 300 shown in FIG. 26, the bore 542 has a first diameter 544 at a first end portion 302 of the hose fitting 300. Along the length 548 of the hose fitting 300, the bore 542 progressively reduces to a second diameter 546, which occurs at the second end portion 306 of the fitting. The bore 542 may reduce gradually or continuously, as shown in FIG. 26, from the first diameter 544 to the second diameter 546. In other embodiments, the bore 542 may reduce from the first diameter 544 to the second diameter 546 in a stepwise manner via a plurality of discrete steps. Though the hose fitting 300 in FIG. 26 includes an acute angle bend 304, in other embodiments, the hose fitting 300 may include a bend of any angle or may not include a bend 304.

Present embodiments include a tunable conduit fitting assembly 60 for coupling a conduit to a BOP 50 or other component in a BOP stack 31. The tunable conduit fitting assembly 60 may include a hose fitting 300 or a manifold 400. One or more floating seal inserts 66 may be disposed between the hose fitting 300 and the BOP 50 to dampen shock in the hydraulic fluid flowing through the conduits and/or hoses 120. Dampening shock in the conduits and/or hoses 120 may reduce or eliminate hose jumping as a result of shockwaves. The tunable conduit fitting assembly 60 may also provide an improved seal, reducing leakage. The hose fitting 300 may be coupled to hose or conduit 120 via threads, crimping, an expansion fitting, clamping, welding, bonding, brazing, adhesive coupling, an interference fit, a shrink-fit, etc., or any combination thereof. In some embodiments, an adapter fitting 352 may be disposed between the hose or conduit 120 and the hose fitting 300. In such an embodiment, the adapter fitting 352 may be coupled to the hose 120 or hose fitting 300 at either end 354, 356 by one or more of the above-mentioned coupling methods. Though present embodiments of the hose fitting are used at either end of a hydraulic hose 120 in a BOP 50 stack, it should be understood that substantially the same or similar fittings may be used in pod receptacles, shuttle valves, remote modules/panels throughout BOP stack, or any BOP stack hose, or any hydraulic hose in the system. Similarly, though the disclosed embodiments include mineral extraction components, it should be understood that the disclosed techniques may be used in any type of hydraulically operated equipment. Additionally, all features illustrated and described above in FIGS. 1-26 are intended to be used in various combinations with one another, and thus, any features illustrated and described with reference to a particular figure are equally applicable to all of the figures.

While the disclosed subject matter may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A system, comprising:
   a hose fitting, comprising:
   a body;
   a fluid passage through the body;
   a first end portion in fluid communication with the fluid passage;
   a second end portion in fluid communication with the fluid passage, wherein the second end portion comprises a first threaded surface;
   a bend portion extending between the first end portion and the second end portion; and
   a first floating seal insert disposed in the first end portion, wherein the first floating seal insert is configured to damp one or more shockwaves having first characteristics; and
   an adapter fitting comprising:
   a third end portion having a second threaded surface configured to mate with the first threaded surface at the second end portion of the hose fitting to couple the third end portion of the adapter fitting to the first end portion of the hose fitting;
   a fourth end portion configured to couple to a hose; and
   wherein the first floating seal insert comprises a first plurality of seals axially offset from a second plurality of seals, wherein the first plurality of seals is disposed on a first portion of the first floating seal insert inside of the hose fitting, and the second plurality of seals is disposed on a second portion of the first floating seal insert outside of the hose fitting.

2. The system of claim 1, wherein the first floating seal insert is configured to damp one or more shockwaves to help reduce uncoupling of a first coupling at the first end portion, a second coupling at the second end portion, or a combination thereof.

3. The system of claim 2, wherein the first and/or second coupling comprises a crimp coupling, an expansive joint coupling, a thermal bond coupling, a threaded coupling, a clamp coupling, or a combination thereof.

4. The system of claim 1, comprising the hose, wherein the first floating seal insert is configured to damp one or more shockwaves to help reduce movement of the hose.

5. The system of claim 1, comprising a mineral extraction component coupled to the hose fitting.

6. The system of claim 5, wherein the mineral extraction component comprises a blowout preventer.

7. The system of claim 1, wherein the hose fitting comprises a splitter or manifold having the fluid passage in fluid communication with the first end portion, the second end portion, and a fifth end portion.

8. The system of claim 1, wherein the body comprises an expanding portion, a reducing portion, or a combination thereof, between the first and second end portions.

9. The system of claim 1, wherein the first or second end portion comprises a crimp coupling.

10. The system of claim 1, wherein the first or second end portion comprises an expansive joint coupling.

11. The system of claim 1, wherein the first or second end portion comprises a thermal bond coupling.

12. The system of claim 1, wherein the first or second end portion comprises a threaded coupling.

13. The system of claim 1, wherein the first or second end portion comprises a clamp coupling.

14. The system of claim 1, wherein the hose fitting comprises a second floating seal insert disposed in the second end portion, wherein the second floating seal insert is configured to damp one or more shockwaves having second characteristics.

15. The system of claim 1, wherein the first floating seal insert comprises one or more axial end seals disposed on a first axial end or a second axial end of the first floating seal insert.

16. The system of claim 1, wherein an outer circumference of the first floating seal insert changes in diameter between opposite axial ends of the first floating seal insert.

17. The system of claim 1, wherein the first floating seal insert comprises a body having one or more seals integrally formed in the body.

18. The system of claim 17, wherein the body and the one or more seals comprise a plastic or elastomeric material.

19. The system of claim 1, wherein the first floating seal insert comprises a body having a plurality of portions coupled together.

20. The system of claim 19, wherein the plurality of portions are made of different materials.

21. The system of claim 19, wherein the plurality of portions have different coefficients of thermal expansion, different degrees of hardness, different degrees of stiffness, different degrees of elasticity, or any combination thereof.

22. The system of claim 1, wherein the fourth end portion is configured to couple to the hose via crimp coupling.

23. A system, comprising:
a hose;
a mineral extraction component;
a hose fitting configured to couple to the hose and the mineral extraction component, wherein the hose fitting comprises:
a body;
a fluid passage through the body;
a first end portion in fluid communication with the fluid passage;
a second end portion in fluid communication with the fluid passage,
a bend portion extending between the first and second portions; and
a first floating seal insert disposed in the first end portion, wherein the first floating seal insert is configured to damp one or more shockwaves having first characteristics; and
an adapter fitting comprising:
a third end portion configured to mate with the second end portion of the hose fitting to couple the third end portion of the adapter fitting to the first end portion of the hose fitting;
a fourth end portion configured to couple to the hose; and
wherein the first floating seal insert comprises a first plurality of seals axially offset from a second plurality of seals, wherein the first plurality of seals is disposed on a first portion of the first floating seal insert inside of the hose fitting, and the second plurality of seals is disposed on a second portion of the first floating seal insert outside of the hose fitting.

24. The system of claim 23, wherein the fitting comprises at least one of:
a split in the fluid passage between the first portion, the second portion, and a fifth portion; or
an expanding portion or a reducing portion in the body between the first and second portions.

25. The system of claim 23, wherein the first and/or second coupling comprises a crimp coupling, an expansive joint coupling, a thermal bond coupling, a threaded coupling, a clamp coupling, or a combination thereof.

26. A system, comprising:
a fitting comprising:
a body;
a fluid passage through the body;
a first end portion of the body in fluid communication with the fluid passage;
a second end portion of the body in fluid communication with the fluid passage;
a bend portion of the body extending between the first end portion and the second end portion; and
a first floating seal insert disposed in the first end portion, wherein the first floating seal insert is configured to damp one or more shockwaves having first characteristics; and
an adapter fitting comprising:
a third end portion configured to couple to the second end portion of the hose fitting;
a fourth end portion configured to couple to a hose; and
wherein the first floating seal insert comprises a first plurality of seals axially offset from a second plurality of seals, wherein the first plurality of seals is disposed on a first portion of the first floating seal insert inside of the hose fitting, and the second plurality of seals is disposed on a second portion of the first floating seal insert outside of the hose fitting.

* * * * *